United States Patent
Baiada et al.

(10) Patent No.: US 6,463,383 B1
(45) Date of Patent: Oct. 8, 2002

(54) METHOD AND SYSTEM FOR AIRCRAFT FLOW MANAGEMENT BY AIRLINES/ AVIATION AUTHORITIES

(76) Inventors: R. Michael Baiada, 30943 Buttermilk Ct., Evergreen, CO (US) 80439; Lonnie H. Bowlin, 700 Woodland Way, Owings, MD (US) 20736

( * ) Notice: Subject to any disclaimer, the term of this patent is extended or adjusted under 35 U.S.C. 154(b) by 0 days.

(21) Appl. No.: 09/861,262

(22) Filed: May 18, 2001

Related U.S. Application Data

(60) Provisional application No. 60/274,109, filed on Mar. 8, 2001, provisional application No. 60/129,563, filed on Apr. 16, 1999, provisional application No. 60/173,049, filed on Dec. 24, 1999, and provisional application No. 60/189,223, filed on Mar. 14, 2000.

(51) Int. Cl.$^7$ .............................................. G06F 163/00
(52) U.S. Cl. ..................... 701/120; 701/121; 701/301; 342/36
(58) Field of Search ................................ 701/120, 121, 701/117, 301, 122, 213; 342/36–38, 454, 455; 340/903, 961, 435

(56) References Cited

U.S. PATENT DOCUMENTS

| | | | |
|---|---|---|---|
| 4,196,474 A | 4/1980 | Buchanan et al. | 701/301 |
| 5,200,901 A | 4/1993 | Gerstenfeld | 701/120 |
| 5,321,605 A | 6/1994 | Chapman et al. | 705/5 |
| 5,369,570 A | 11/1994 | Parad | 705/9 |
| 5,890,133 A | 3/1999 | Ernst | 705/7 |
| 5,953,707 A | 9/1999 | Huang et al. | 705/10 |
| 6,049,754 A * | 4/2000 | Beaton et al. | 701/204 |
| 6,195,609 B1 * | 2/2001 | Pilley et al. | 701/120 |

OTHER PUBLICATIONS

Unkown, Center–Tracon Automation System, Sep. 5, 1991.
Baiada, DNAV: What's So Different About It, Professional Pilot, Apr. 1984, pp. 74–88.
Carr et al., Airline Arrival Prioritization In Sequencing and Scheduling, Dec. 1998, 8p.
Quinn & Zelenka, ATC/Air Carrier Collaborative Arrival Planning, Dec. 1998, 11p.

(List continued on next page.)

Primary Examiner—William A. Cuchlinski, Jr.
Assistant Examiner—Marthe Marc-Coleman
(74) Attorney, Agent, or Firm—Larry J. Guffey

(57) ABSTRACT

A method is presented for managing, in real time, the arrival and departure of a plurality of aircraft to and/or from a specified system resource (e.g., an airport, gate, section of airspace) or set of system resources based upon consideration of the surrounding weather conditions, specified data regarding the system resource and the plurality of aircraft and their operational and safety goals. This method comprises the steps of: (a) collecting and storing the specified data and weather conditions, (b) processing the specified data and weather conditions to predict the aircraft's arrival fix times, (c) using these predicted arrival fix times to compute the value of a specified goal function which is a measure of how well the aircraft will meet their safety and operational goals if they achieve the predicted arrival fix times, (d) optimizing the goal function with respect to the predicted arrival fix times by identifying potential temporal changes in the predicted arrival fix times so as to better optimize the value of the goal function, (e) translating these temporal changes into a new set of targeted arrival fix times or enroute speeds as necessary to meet the targeted arrival fix times for the aircraft, (f) communicating the new targeted arrival fix times or enroute speeds as necessary to meet the targeted arrival fix times to the aircraft so that these temporal changes may be implemented, (g) monitoring the system resource capacity, aircraft and weather to identify predicted changes in the targeted arrival fix times or system resource capacity which will result in a specified decrease in the value of the optimized goal function, and (h) if such monitoring identifies that the specified decrease in the value of the optimized goal function is predicted to occur, repeat the above steps.

26 Claims, 20 Drawing Sheets

OTHER PUBLICATIONS

Baiada, Tactical Aircraft Management, Internal Memo to United Airlines, May 9, 1996, 17p.

Baiada, RMB Assoc., Free Flight: Reinventing Air Traffic Control, Mar. 15, 1995, 9p.

Baiada & Bowlin, U.S. Provisional Patent Applications: Application No. 60/129,563, filed Apr. 16, 1999 and entitled "Tactical Airline Management".

Baiada & Bowlin, U.S. Provisional Patent Application No. 60/173,049, filed Dec. 24, 1999, entitled "Tactical Airline Management".

Baiada & Bowlin, U.S. Provisional Patent Application No. 60/247,109, filed Mar. 8, 2001, entitled "Method and System For Aircraft Flow Management".

Baiada & Bowlin, U.S. patent application Ser. No. 09/549,074, filed Apr. 16, 2000, entitled "Tactical Airline Management".

Baiada & Bowlin, U.S. Provisional Patent Application No. 60/189,223, filed Mar. 14, 2000, entitled "Tactical Airline Management".

* cited by examiner

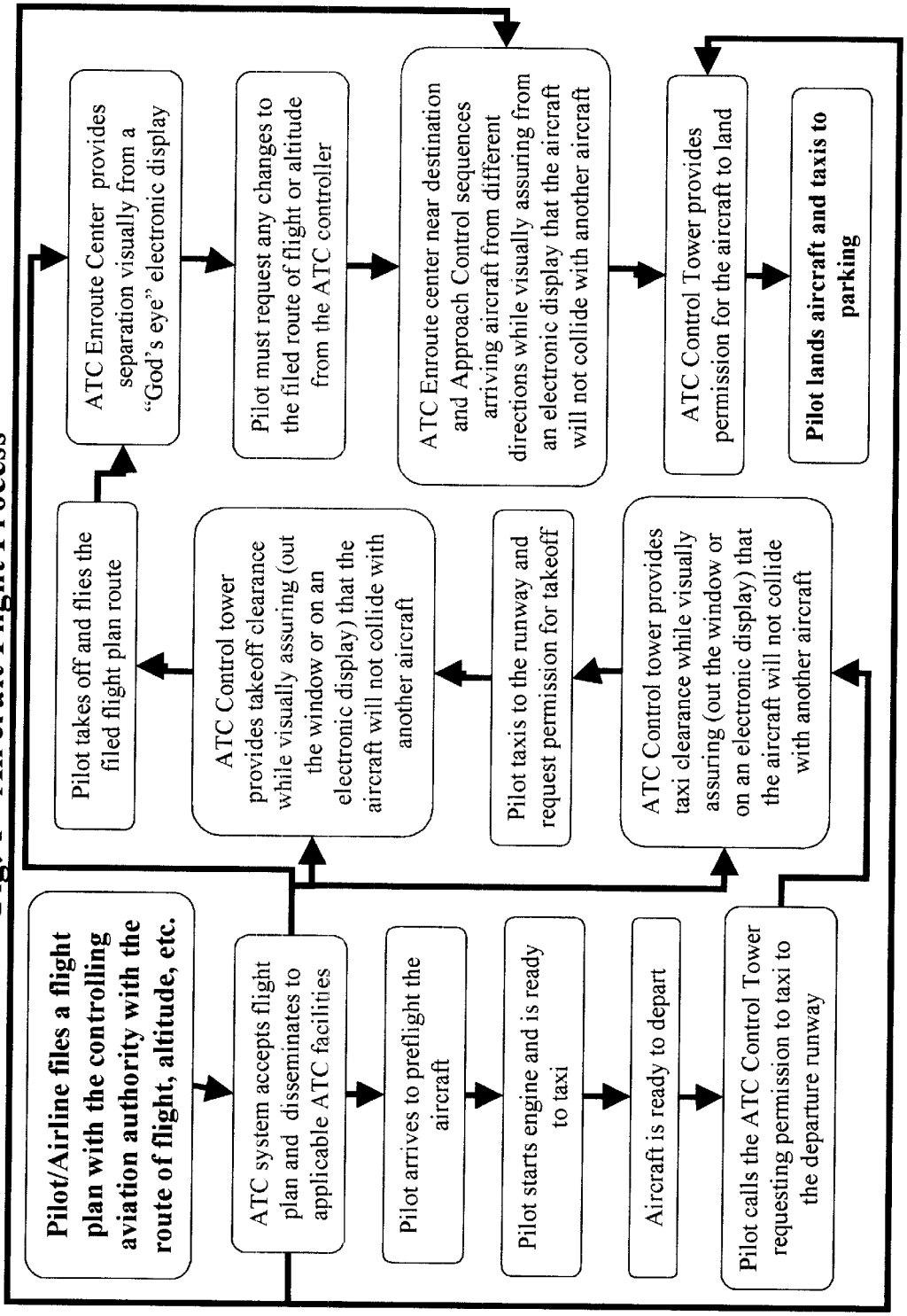
Fig. 1 - Aircraft Flight Process

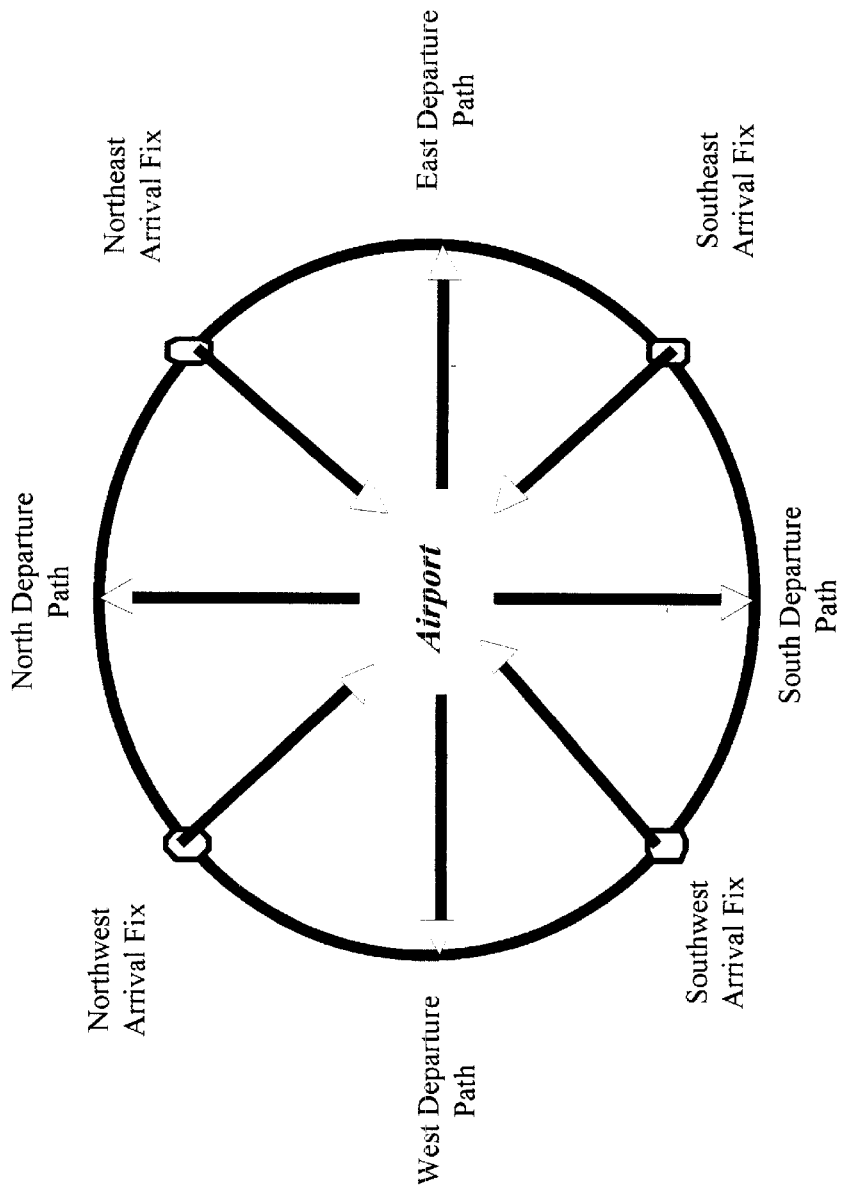
Fig. 2- Airport Arrival/Departure Flow

Fig. 3 - DFW CTAS Data, 2200 TO 2230 CMT Arrivals – 11/6/98

| # | Flight | Orig | Rwy | Time | # | Flight | Orig | Rwy | Time | # | Flight | Orig | Rwy | Time |
|---|---|---|---|---|---|---|---|---|---|---|---|---|---|---|
| 1. | AAL458 | SJC | 18R | 2201 | 19. | EGF718 | MAF | 13R | 2208 | 36. | USA777 | PIT | 18R | 2218 |
| 2. | EGF026 | MEM | 17L | 2201 | 20. | AAL656 | ABQ | 18R | 2209 | 37. | AAL1016 | SAN | 17C | 2219 |
| 3. | AAL1707 | TPA | 17C | 2201 | 21. | EGF114 | LCH | 17L | 2209 | 38. | AAL1280 | LGB | 18R | 2219 |
| 4. | EGF202 | SHV | 17L | 2202 | 22. | AAL2161 | EWR | 17C | 2209 | 39. | AAL1884 | SAT | 17C | 2220 |
| 5. | EGF784 | ACT | 13R | 2202 | 23. | EGF621 | HOU | 17L | 2210 | | | | | |
| 6. | TWA453 | STL | 18R | 2202 | 24. | EGF704 | XNA | 17C | 2210 | 40. | AAL794 | SEA | 13R | 2221 |
| 7. | EGF736 | TUL | 17L | 2203 | 25. | AAL1188 | ONT | 13R | 2210 | 41. | AMT255 | MDW | 18R | 2221 |
| 8. | AAL1498 | SNA | 18R | 2203 | | | | | | 42. | AAL48 | PHX | 13R | 2222 |
| 9. | AAL2038 | IAH | 17C | 2203 | 26. | AAL50 | DEN | 18R | 2211 | 43. | AAL564 | ICT | 17C | 2222 |
| 10. | AAL79 | EGK | 17C | 2204 | 27. | AAL1714 | LAS | 13R | 2212 | 44. | AAL496 | TUS | 18R | 2223 |
| 11. | EGF650 | LIT | 17L | 2204 | 28. | AAL839 | MSY | 17C | 2213 | 45. | AAL9649 | MCO | 17C | 2223 |
| 12. | AWE544 | PHX | 18R | 2205 | 29. | AAL1412 | ELP | 18R | 2214 | | | | | |
| | | | | | 30. | AAL1720 | OKC | 13R | 2214 | 46. | AAL1552 | SFO | 18R | 2226 |
| 13. | EGF854 | TYR | 17L | 2206 | 31. | AAL1306 | SLC | 13R | 2215 | 47. | AAL1890 | LAX | 17C | 2226 |
| 14. | KHA200 | FTW | 13R | 2206 | | | | | | 48. | UAL478 | SFO | 18R | 2228 |
| 15. | DAL237 | ATL | 18R | 2207 | 32. | AAL2233 | ORD | 17C | 2216 | 49. | UAL1055 | ORD | 18R | 2229 |
| 16. | EGF094 | GGG | 17L | 2207 | 33. | COA186 | IAH | 18R | 2217 | 50. | AAL1978 | AUS | 17C | 2230 |
| 17. | AAL1779 | LIT | 17C | 2207 | 34. | AAL1404 | COS | 17C | 2217 | | | | | |
| 18. | EGF128 | TXK | 17C | 2208 | 35. | AAL742 | MCI | 13R | 2218 | | | | | |

Fig. 4 - December 2000 DOT Data

DECEMBER 2000 AIR TRAVEL CONSUMER REPORT
TABLE 3. PERCENTAGE OF ALL CARRIERS' REPORTED FLIGHT OPERATIONS ARRIVING ON TIME
BY AIRPORT AND TIME OF DAY (REPORTABLE AIRPORTS ONLY)

| ARRIVAL AIRPORT SCHEDULED ARRIVAL TIME | ATL | BOS | BWI | CLT | CVG | DCA | DEN | DFW | DTW | EWR | IAH | JFK | LAS |
|---|---|---|---|---|---|---|---|---|---|---|---|---|---|
| 600 - 659 AM | 80.4 | 72.7 | 71.0 | 91.3 | 66.7 | 50.0 | 72.4 | 75.1 | 63.7 | 71.0 | 90.4 | 72.8 | 90.7 |
| 700 - 759 AM | 71.5 | 71.1 | 84.0 | 81.5 | 68.6 | 70.8 | 71.9 | 80.5 | 68.6 | 72.0 | 84.6 | 65.6 | 92.3 |
| 800 - 859 AM | 62.7 | 68.3 | 84.6 | 71.7 | 75.7 | 81.5 | 74.5 | 68.3 | 64.1 | 73.3 | 80.2 | 80.6 | 76.7 |
| 1000 - 1059 AM | 60.4 | 67.9 | 75.5 | 66.1 | 73.8 | 68.6 | 65.1 | 72.1 | 67.0 | 74.0 | 77.4 | 78.0 | 61.3 |
| 1100 - 1159 AM | 61.3 | 70.0 | 78.7 | 75.1 | 59.7 | 71.8 | 72.7 | 70.5 | 63.7 | 72.7 | 70.6 | J/ | 68.1 |
| 1200 - 1259 PM | 60.3 | 68.9 | 79.2 | 65.2 | 61.3 | 68.0 | 62.7 | 71.9 | 66.7 | 67.8 | 82.5 | J/ | 64.0 |
| 100 - 159 PM | 52.9 | 70.2 | 68.5 | 75.0 | 73.3 | 71.4 | 62.8 | 74.3 | 59.6 | 66.8 | 75.2 | 72.9 | 63.9 |
| 200 - 259 PM | 56.6 | 67.6 | 71.2 | 70.5 | 71.0 | 71.7 | 68.4 | 63.6 | 55.4 | 67.3 | 74.4 | 67.6 | 65.1 |
| 300 - 359 PM | 55.5 | 62.1 | 69.4 | 67.1 | 65.2 | 76.3 | 67.5 | 70.9 | 59.1 | 67.6 | 72.2 | 76.6 | 65.7 |
| 400 - 459 PM | 54.0 | 65.9 | 68.2 | 64.7 | 58.0 | 69.6 | 58.3 | 68.4 | 60.3 | 66.2 | 74.6 | 69.9 | 61.6 |
| 500 - 559 PM | 50.6 | 60.4 | 68.1 | 71.7 | 60.5 | 63.0 | 62.7 | 57.4 | 56.0 | 60.3 | 69.1 | 71.6 | 55.9 |
| 600 - 659 PM | 52.8 | 60.4 | 65.4 | 63.5 | 60.2 | 65.9 | 53.6 | 62.6 | 54.0 | 61.1 | 69.1 | 59.2 | 63.6 |
| 700 - 759 PM | 44.7 | 64.7 | 59.6 | 66.5 | 59.9 | 67.4 | 54.3 | 66.2 | 56.6 | 63.1 | 74.0 | 58.2 | 57.2 |
| 800 - 859 PM | 49.3 | 60.0 | 58.5 | 58.1 | 56.7 | 68.9 | 61.6 | 55.5 | 49.7 | 65.5 | 67.1 | 59.6 | 57.8 |
| 900 - 959 PM | 48.7 | 59.6 | 65.4 | 71.3 | 61.9 | 60.0 | 61.9 | 62.9 | 60.3 | 66.3 | 64.7 | 68.9 | 60.1 |
| 1000 - 1059 PM | 53.8 | 63.0 | 63.4 | 50.0 | 38.3 | 68.1 | 59.5 | 57.1 | 53.9 | 60.8 | 54.9 | 64.9 | 60.9 |
| 1100 - 559 AM | 57.7 | 62.1 | 63.7 | 65.7 | 55.7 | 55.4 | 59.9 | 65.5 | 56.9 | 70.7 | 62.8 | 68.1 | 61.9 |
| TOTAL by Airport | 56.9 | 65.0 | 69.8 | 70.1 | 64.5 | 69.1 | 64.1 | 67.1 | 59.9 | 67.0 | 73.7 | 68.2 | 64.6 |

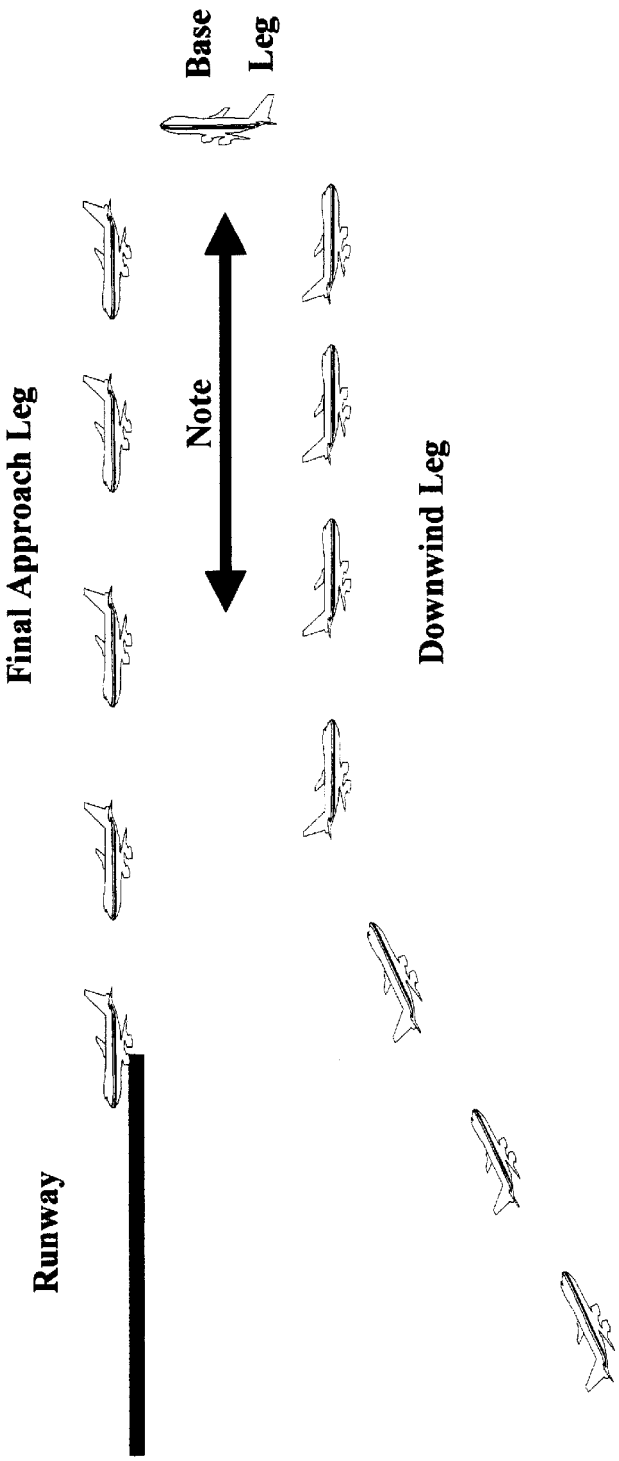
Fig. 5 - The Runway Arrival Trombone
Note - Additional aircraft are warehoused by extending the distance from the base leg to the runway (i.e., extending the trombone), which lengthens the downwind and final approach segments of the approach allowing space for the extra aircraft.

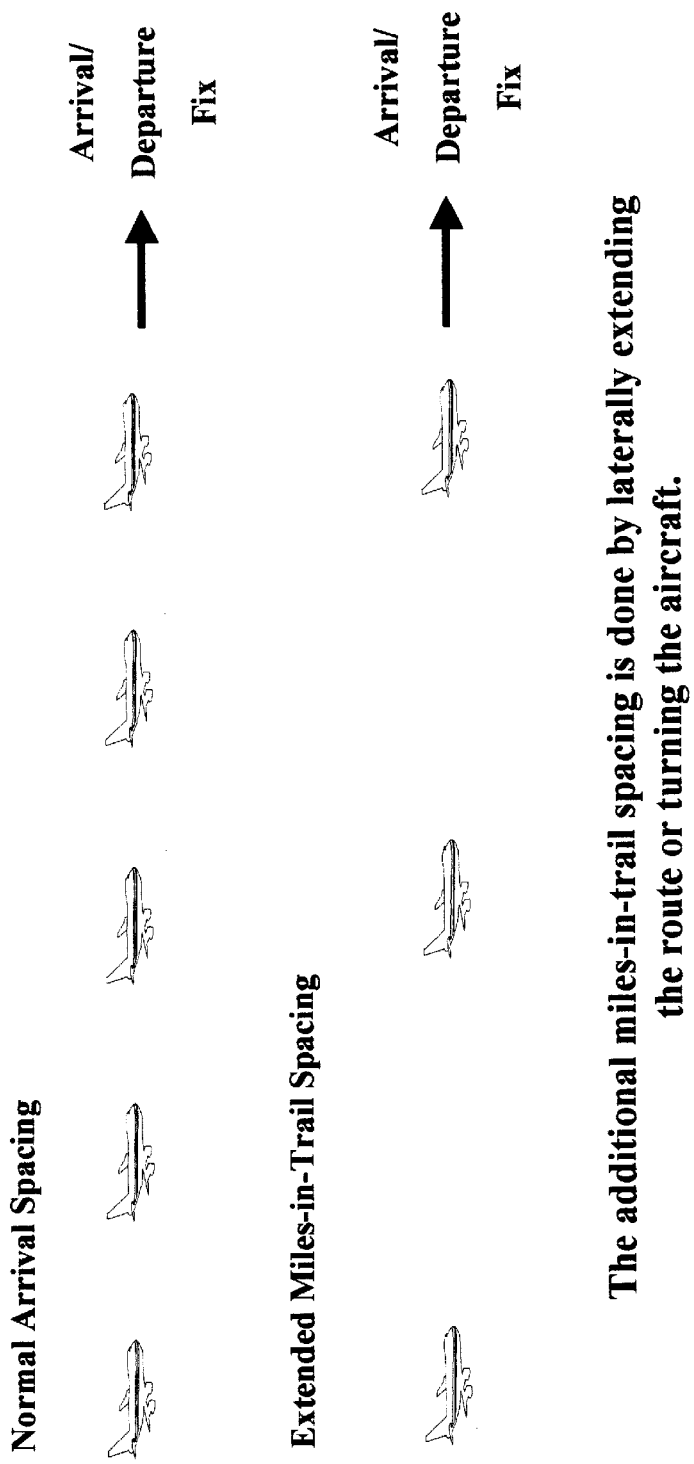

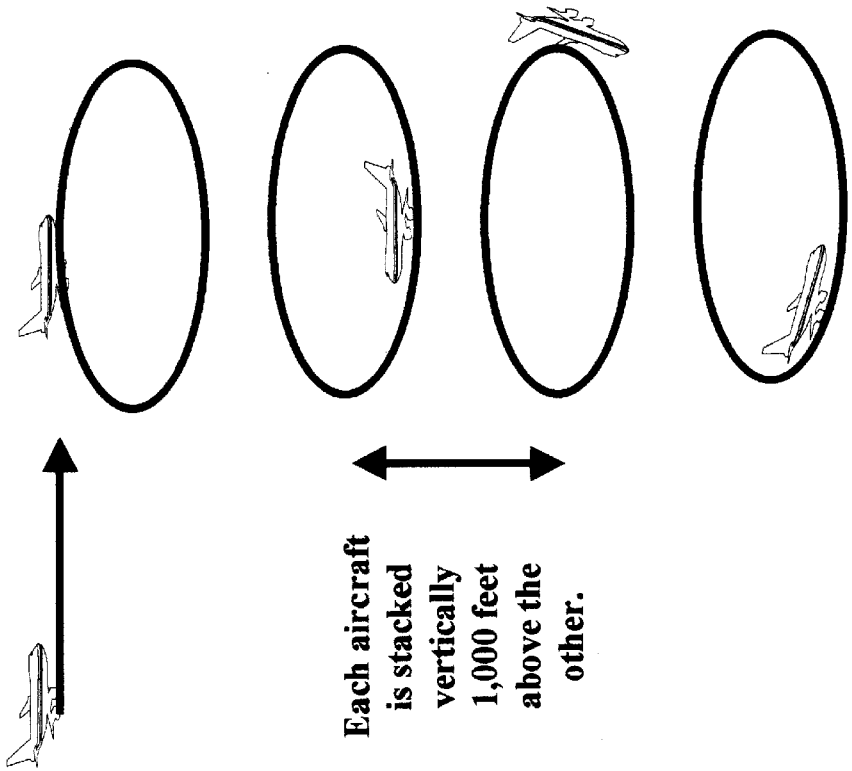
Fig. 7 - Airborne Holding

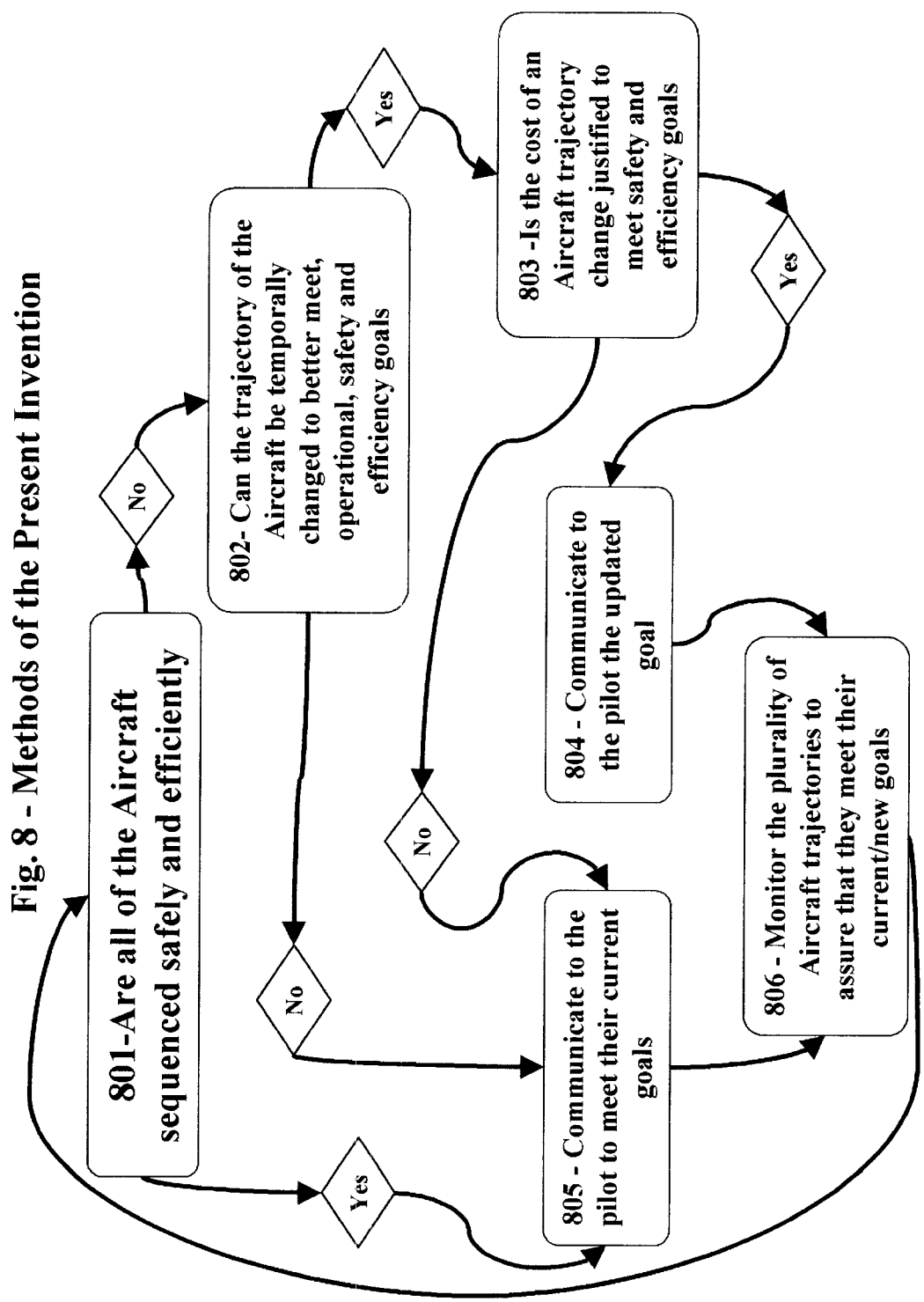
Fig. 8 - Methods of the Present Invention

Fig 9a - Decision/Command Matrix

Critical Factors:

- What is the optimum airport arrival time for each aircraft as determined by the airline/user/pilot?
- What can the individual airlines do to meet the needs of all of the aircraft approaching the airport?
- Is the airspace infrastructure (runways, airspace, arrival fix) capable of meeting the aircraft needs taking into account available assets and the needs of all of the other aircraft?
- What time are the control actions taken? [Note: the future trajectory prediction of all of the assets is an important aspect of this decision]
- Decisions 1 and 2 are made by the user and passed to the Aviation Authority (if this is the operator) for integration to the Present invention. Absence any information to from the airline/user/pilot, the present invention works towards safety, operational and efficiency goals.

Fig. 9b – Decision/Command Matrix
Decision 1 – Intra-Aircraft Decisions

Focus – Aircraft and User Needs and Wants

What does the individual aircraft need and/or want?
Arrival at airport at OAG Scheduled Arrival Time
Evaluate future trajectories for needs (Look Ahead)
Enough airport Time to:
  - Get Passengers off/on
  - Get Baggage off/on
  - Get Cargo off/on
  - Complete Aircraft Servicing (lavs, food, etc.)
  - Complete required maintenance items
  - Depart on time for next segment
Enough connection time for passengers Maintenance Actions
  - Scheduled maintenance
  - Unscheduled repairs
  - Deicing
  - Known repairs
Shorter route
Comfortable ride
Use Minimum Fuel
A gate upon arrival
Crew (Pilots and Flight Attendants)

Key Questions
What services does aircraft need? Regular or special?
What time does aircraft want to arrive in a perfect world?

Aircraft Characteristics
Safe Speed Range
Fuel Burn Model (fuel available to make desired change)
Wind Model
Altitude Capability (aircraft weight)

Enroute Weather Model
Enroute Turbulence Model
Aircraft position data
Fuel Burn Model (minimum fuel usage)

Fig. 9c - Decision/Command Matrix
Decision 2 - Intra-Airline Decisions

Focus - Airline Capabilities to meet needs of all aircraft

Can the airline meet the aircraft's needs?
- Gate Availability
- Jetway or Stair Availability
- Baggage Crew Availability
- Fueling Availability
- Flow of Passenger Connecting Flights
- Mechanic Availability

- Dynamic Gate Management
- Asset Trajectory Matching
- Cleaning Crew Availability
- Agent Availability
- Galley Loading/Unloading
- Parts Availability

Key Questions
- What is the airline's ability to meet the needs of all aircraft?
- Will airline service capability delay aircraft?

Airline Data
- Airport data
- Fuel truck data
- Passenger data/model
- Mechanic data

- Crew data
- Customer Service Agent data
- Galley data
- Aircraft parts data

Fig. 9d – Decision/Command Matrix
Decision 3 – Aviation Authority Decisions

Focus – Infrastructure Capabilities to meet needs of all aircraft

Can the infrastructure meet the aircraft's needs?

Airspace Availability
    Arrival Fix Availability
    Weather
    Airline/pilot requirements (Decision 1 and 2 data if available)

Runway Availability
    Infrastructure Trajectory Matching
    Demand

Key Questions

What is aviation authorities ability to meet needs of all aircraft?
    Will infrastructure constraints delay aircraft?

Infrastructure Data

Runway Acceptance Rate
    Weather

Cornerpost Acceptance Rate
    Equipment Status

Fig. 9e – Decision/Command Matrix

Control Action 1 - Airline/Aviation Authority

Focus – How and When to Make Control Action Happen

Control Actions

Transmit fix crossing time to aircraft

Monitor actions to assure aircraft response meets the new assigned goals

Key Questions

What time should control action take place?

How should pilot be notified?

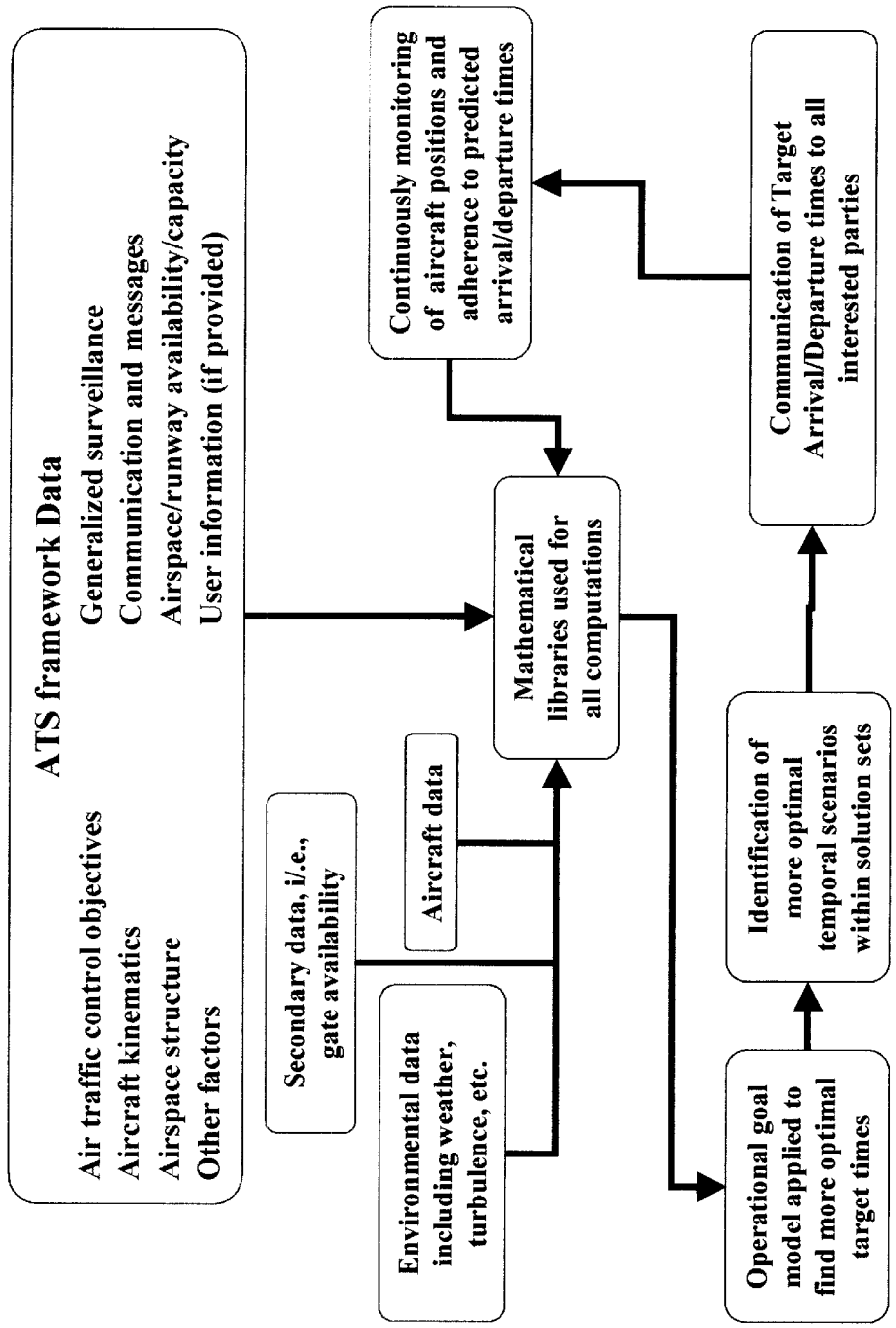
Fig. 10 - Data Sets

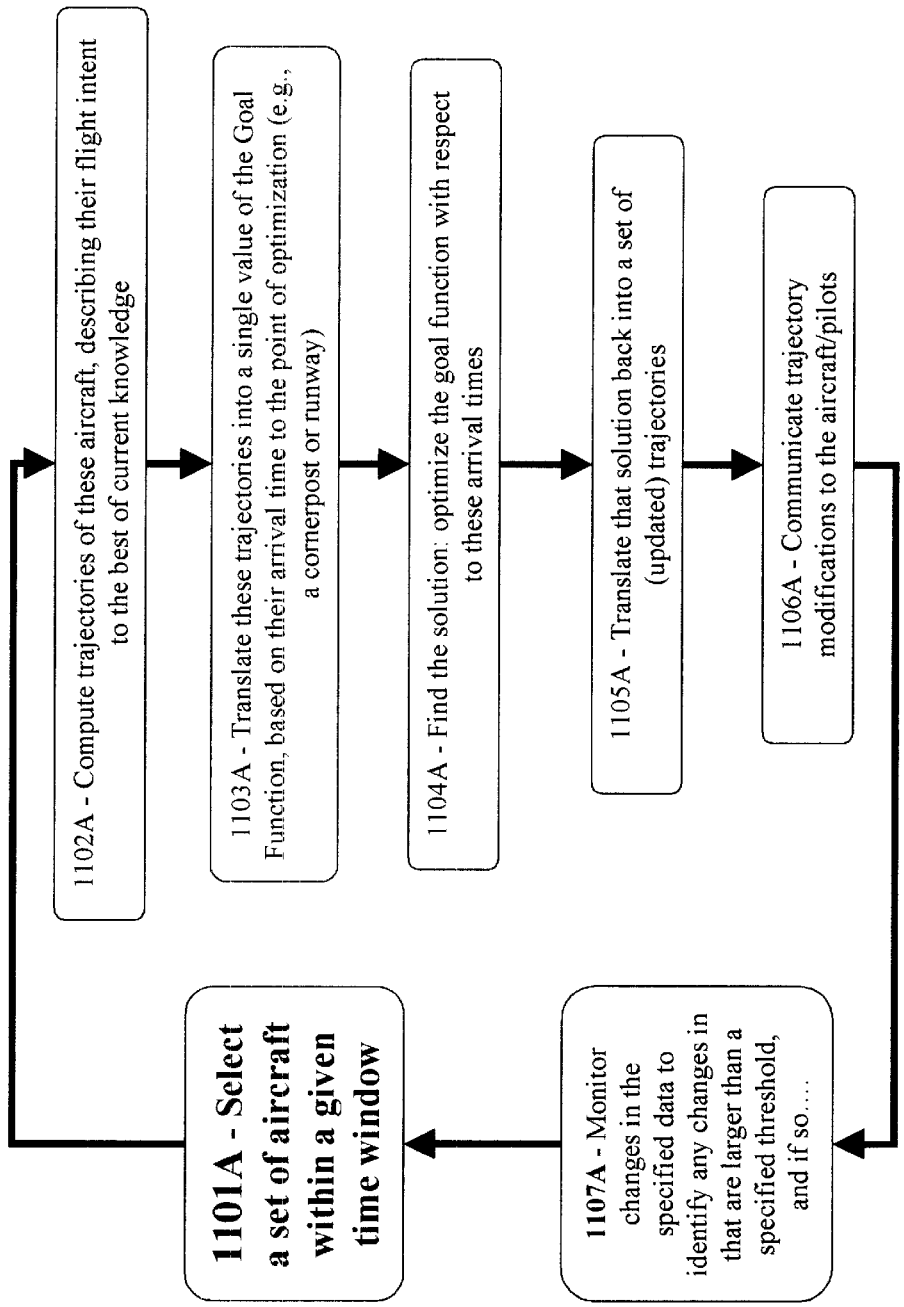

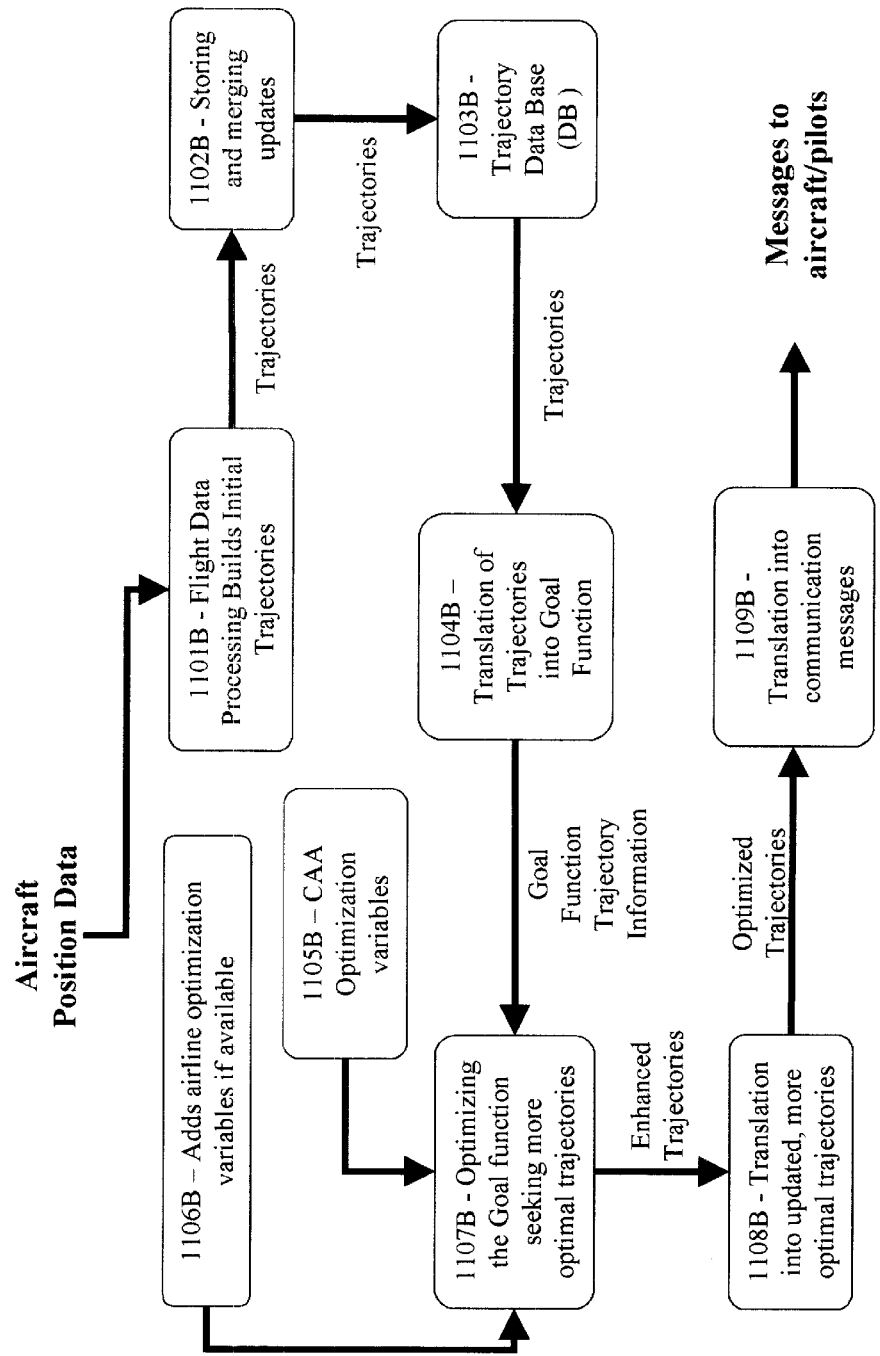
Fig. 11b - Sample of the Method's Processing Sequence

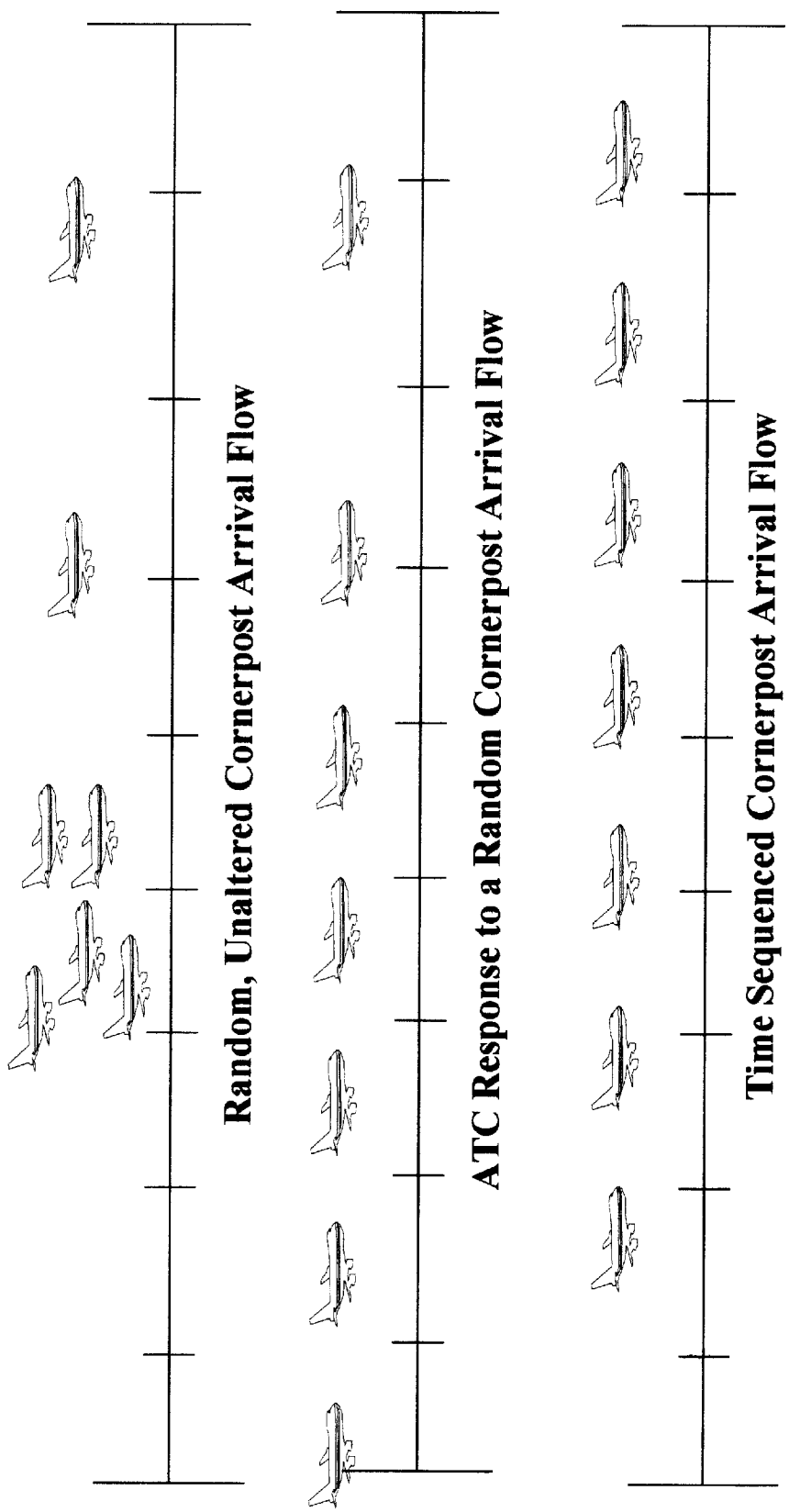
Fig. 12 – Random versus Time Sequenced Cornerpost Arrival Flow For the Same Set of Aircraft

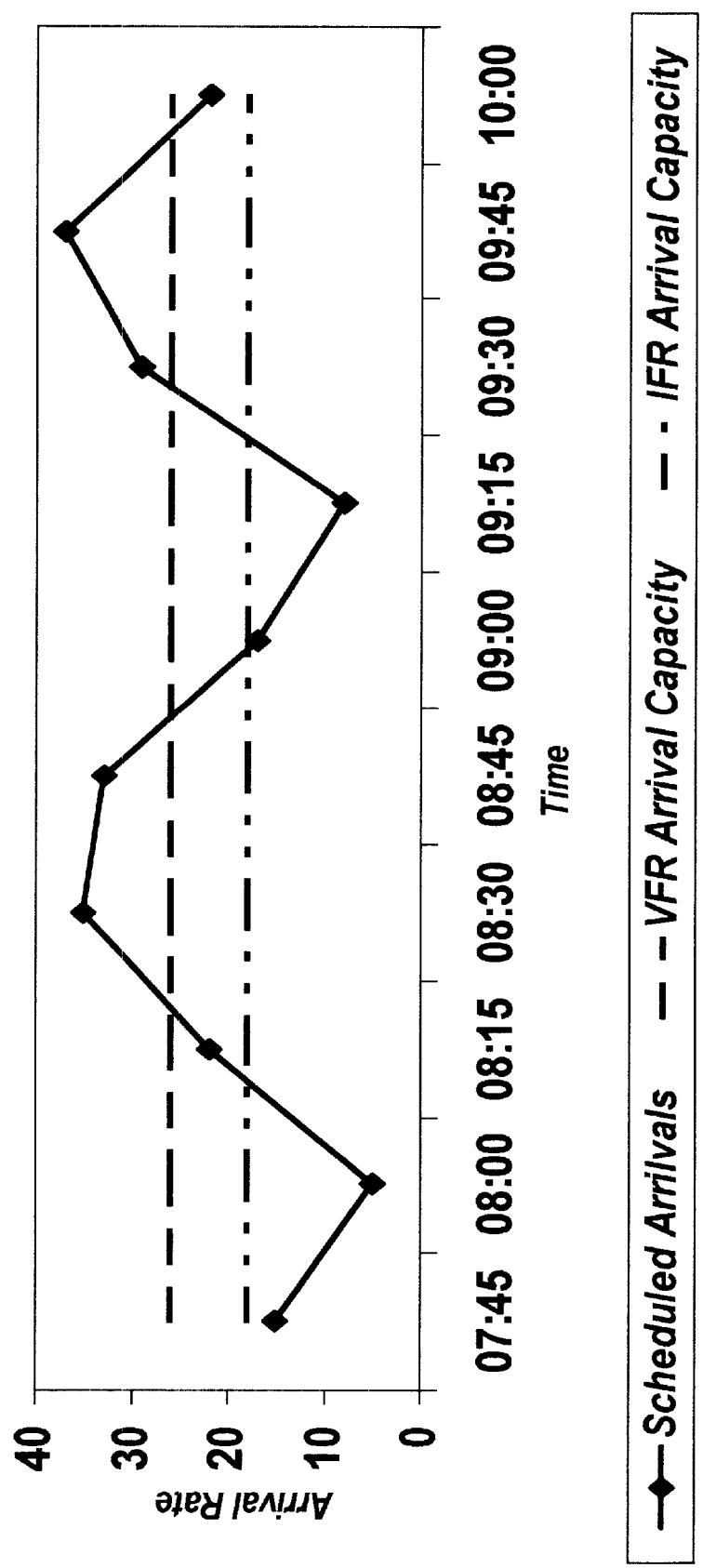
Fig. 13 - Typical Hub Arrival Schedules versus Capacity Shown In 15 Minute Blocks

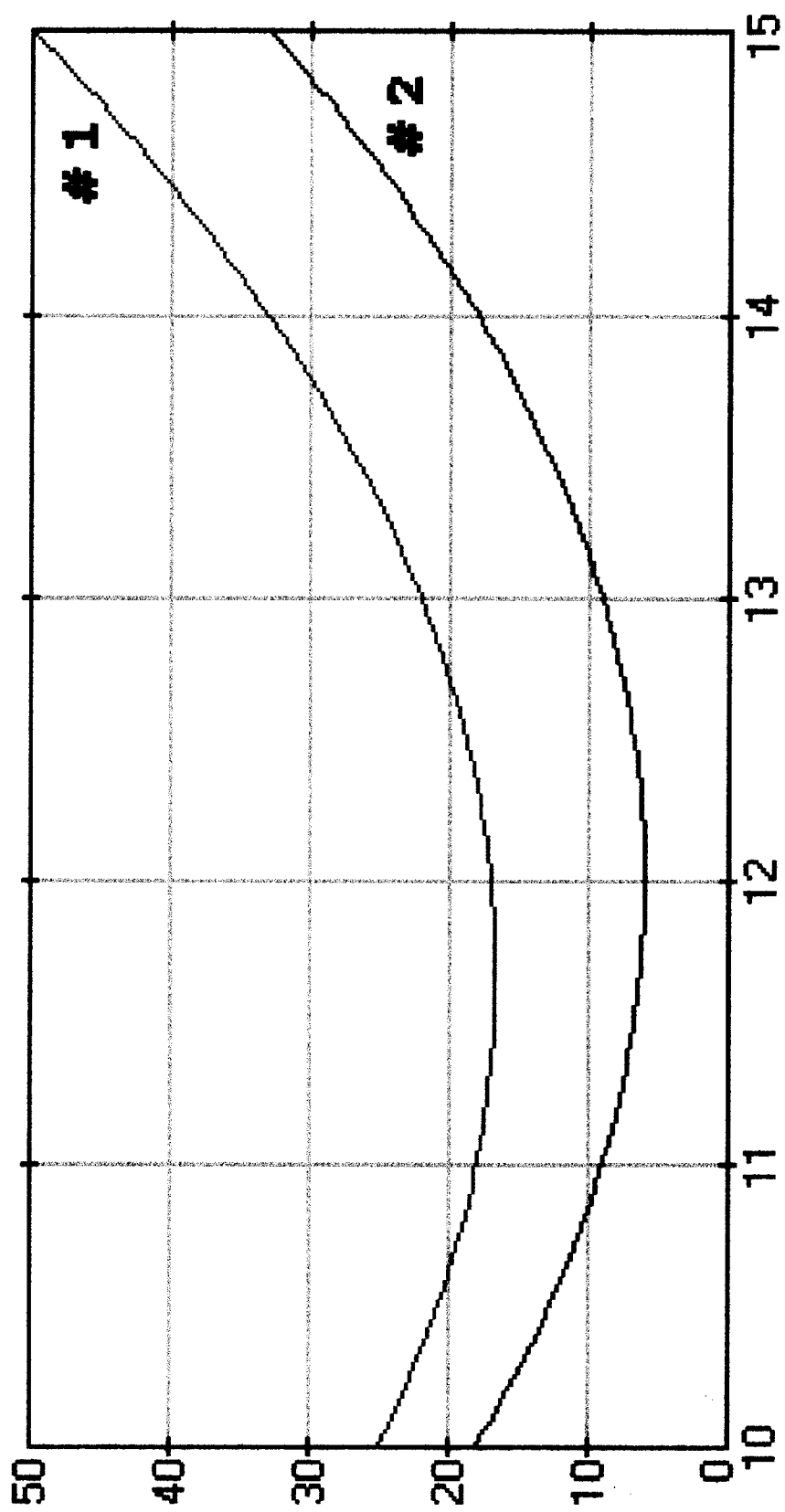
Fig. 14 - Single-aircraft Goal Function component for two aircraft (example)

Fig. 15 - Total Goal Function for a system of two aircraft (example)

|         | $t_2=10$ | $t_2=11$ | $t_2=12$ | $t_2=13$ | $t_2=14$ | $t_2=15$ |
|---------|----------|----------|----------|----------|----------|----------|
| $t_1=10$ | 1043 | 34   | 31   | 34   | 43   | 58   |
| $t_1=11$ | 36   | 1027 | 24   | 27   | 36   | 51   |
| $t_1=12$ | 35   | 26   | 1023 | 26   | 35   | 50   |
| $t_1=13$ | 40   | 31   | 28   | 1031 | 40   | 55   |
| $t_1=14$ | 51   | 42   | 39   | 42   | 1051 | 66   |
| $t_1=15$ | 68   | 59   | 56   | 59   | 68   | 1083 |

METHOD AND SYSTEM FOR AIRCRAFT FLOW MANAGEMENT BY AIRLINES/ AVIATION AUTHORITIES

CROSS-REFERENCE TO RELATED APPLICATIONS

This application is related to the following U.S. Patent Applications: Provisional Application No. 60/274,109, filed Mar. 8, 2001 and entitled "Method And System For Aircraft Flow Management By Aviation Authorities", Provisional Application No. 60/129,563, filed Apr. 16, 1999 and entitled "Tactical Aircraft Management", Provisional Application No. 60/173,049, filed Dec. 24, 1999 and Provisional Application No. 60/189,223, filed Mar. 14, 2000, both entitled "Tactical Airline Management," and Regular Application No. 09/549074, filed Apr. 16, 2000 and entitled "Tactical Airline Management," all these applications having been submitted by the same applicants: R. Michael Baiada and Lonnie H. Bowlin. The teachings of these applications are incorporated herein by reference to the extent that they do not conflict with the teaching herein.

BACKGROUND OF THE INVENTION

1. Field of the Invention

The present invention relates to data processing, vehicle navigation, flow management and time sequencing systems. More particularly, this invention relates to methods and systems for airlines/aviation/airport authorities to better manage the arrival/departure flow of a plurality of aircraft into and out of a system resource, like an airport, or a set of system resources, so as to yield increased aviation safety and airline/airport/airspace operating efficiency.

2. Description of the Related Art

The need for and advantages of management operation systems that optimize complex, multi-faceted processes have long been recognized. Thus, many complex methods and optimization systems have been developed. However, as applied to management of the aviation industry, such methods often have been fragmentary or overly restrictive and have not addressed the overall optimization of key aspects of an aviation authority's regulatory function, such as the flow of a plurality of arrival/departure aircraft to/from a system resource or set of system resources.

The patent literature for the aviation industry's operating systems and methods includes: U.S. Pat. No. 5,200,901—"Direct Entry Air Traffic Control System for Accident Analysis and Training," U.S. Pat. No. 4,926,343—"Transit Schedule Generating Method and System," U.S. Pat. No. 4,196,474—"Information Display Method and Apparatus for Air Traffic Control," United Kingdom Patent No. 2,327,517A—"Runway Reservation System," and PCT International Publication No. WO 00/62234—"Air Traffic Management System."

Aviation regulatory authorities (e.g., various Civil Aviation Authorities (CAA) throughout the world, including the Federal Aviation Administration (FAA) within the U.S.) are responsible for matters such as the separation of in-flight aircraft. In an attempt to optimize their regulation of this activity, most CAAs have chosen to segment this activity into various phases (e.g., taxi separation, takeoff runway assignment, enroute separation, oceanic separation, arrival/departure sequencing and arrival/departure runway assignment) which are often sought to be independently optimized.

These optimizations are usually attempted by various, independent ATC controllers. Unfortunately, this situation often appears to result in optimization actions by individual parts of the airspace system (e.g., individual controllers or pilots) which have the effect of reducing the aviation industry's overall safety and efficiency.

There appears to have been few successful attempts by the various airlines/CAAs/airports to make real-time, trade-offs between their different segments and the competing goals of these segments as it relates to optimizing the safe and efficient movement of aircraft. For example, in the sequencing of the arrival/departure flow of aircraft to an airport, it often happens that some sequencing actions are taken too early (e.g., ground holds on aircraft before enough data is analyzed to determine the validity of an apparent constraint in the arrival/departure flow; see PCT International Publication No. WO 00/62234—"Air Traffic Management System") or too late (e.g., when an aircraft is within 50 to 100 miles from an airport) to resolve a problem.

To better understand these aviation processes, FIG. 1 has been provided to indicate the various segments in a typical aircraft flight process. It begins with the filing of a flight plan by the airline/pilot with a CAA. Next the pilot arrives at the airport, starts the engine, taxis, takes off, flies the flight plan (i.e., route of flight), lands and taxis to parking. At each stage during the movement of the aircraft on an IFR flight plan, the CAA's Air Traffic Control (ATC) system must approve any change to the trajectory of the aircraft. Further, anytime an aircraft on an IFR flight plan is moving, an ATC controller is responsible for ensuring that an adequate separation from other aircraft is maintained. During the last part of a flight, typical initial arrival sequencing (accomplished on a first come, first serve basis, e.g., the aircraft closest to the arrival fix is first, next closest is second and so on) is accomplished by the enroute ATC center near the arrival/departure airport (within approximately 100 miles of the airport), refined by the arrival/departure ATC facility (within approximately 25 miles of the arrival airport), and then approved for landing by the arrival ATC tower (within approximately 5 miles of the arrival airport).

For example, current CAA practices for managing arrivals at arrival airports involve sequencing aircraft arrivals by linearizing an airport's traffic flow according to very structured, three-dimensional, aircraft arrival paths, 100 to 200 miles from the airport or by holding incoming aircraft at their departure airports. For a large hub airport (e.g., Chicago, Dallas, Atlanta), these paths involve specific geographic points that are separated by approximately ninety degrees; see FIG. 2. Further, if the traffic into an arrival fix to the airport is relatively continuous over a period of time, the linearization of the aircraft flow is effectively completed hundreds of miles from the arrival fix. This can significantly restrict all the aircraft's arrival speeds, since all in the line of arriving aircraft are limited to that of the slowest aircraft in the line ahead.

Unfortunately, if nature adds a twenty-mile line of thunderstorms over one of the structured arrival fixes—the flow of traffic stops. Can the aircraft easily fly around the weather? Yes. Will the structure in the current ATC system allow it? No. To fly around the weather, an arriving aircraft could potentially conflict with the departing aircraft which the system dictates must climb out from the airport between the arrival fixes.

The temporal variations in the flow of aircraft into an airport can be quite significant. FIG. 3 shows for the Dallas-Ft. Worth Airport the times of arrival at the airport's runways for the aircraft arriving during the thirty minute time period from 22:01 to 22:30. It can be seen that the numbers of aircraft arriving during the consecutive, five-minute intervals during this period were 12, 13, 6, 8, 6 and 5, respectively. While some of these variations are due to the aircraft's planed scheduling differences, much of it is also seen to be due to the many decisions, independent in nature, that impact whether a scheduled flight will arrive at its fix point at its scheduled time. These decisions may include whether a customer service agent shuts a departing aircraft's door at the scheduled time or maybe waits for some late, connecting passengers, or the personal preferences that the pilots exhibit in setting their flight speeds for the various legs of their flights. These types of independent decisions lead to a random distribution of the arrival aircraft, regardless of the schedule, and obviously effect the outcome of the arrival flow. This type of random arrival pattern leads to random spacing of the arrival aircraft as they approach a runway, which leads to wasted capacity.

Much of the current thinking concerning the airline/ATC delay problem is that it stems from the over scheduling by the airlines of too many aircraft into too few runways. While this may be true in part, it is also the case that the many apparently independent decisions that are made by an airline's ATC staff and various ATC controllers may significantly contribute to airline/ATC delay/congestion problems.

These delays are especially problematic since they are seen to be cumulative. FIG. 4 shows, for all airlines and a number of U.S. airports, the percentage of aircraft arriving on time during various one hour periods throughout a typical day. This on time arrival performance is seen to deteriorate throughout the day.

Where there are problems with over scheduling, the optimal, real-time sequencing of the various sizes of incoming aircraft could conceivably offer a possible mechanism for remedying such problems. For example, the consistent flow of aircraft at the runway end can increase effective capacity. Further, current aviation authority rules require different spacing between aircraft based on the size of the aircraft. Typical spacing between the arrival of aircraft of the same size is three miles, or approximately one minute based on normal approach speeds. But if a small (Learjet, Cessna 172) or medium size aircraft (B737, MD80) is behind a large aircraft (B747, B767), this spacing distance is stretched out to five miles or one and a half to two minutes for safety considerations.

Thus, it can be seen that if a sequence of ten aircraft is such that a large aircraft alternates every other one with a small aircraft, the total distance of the arrival sequence of aircraft to the runway (5+3+5+3+5+3+5+3+5+3) is 40 miles. But if this sequence can be altered to put all of the small aircraft in positions 1 through 5, and all of the very large aircraft in slots 6 through 10, the total distance of the arrival sequence of aircraft to the runway is only 30 miles, since the spacing between the aircraft is consistently 3 miles. If the sequence is altered to the second scenario, the ten aircraft can land in a shorter period of time, thus freeing up additional landing slots behind this group of ten aircraft.

Unfortunately, to correct over capacity problems in the current art, the controller only has one option. They take the first over-capacity aircraft that arrives at the airport and move it backward in time. The second such aircraft is moved further back in time, the third, even further back, etc. Without a process in the current art to move aircraft forward in time or manage the arrival sequence in real time, the controller has only one option—delay the arrivals.

The current art of aircraft flow sequencing (to assure proper aircraft separation) to an airport can be broken down into seven distinct tools used by air traffic controllers, as applied in a first come, first serve basis, include:

1. Structured DogLeg Arrival Routes—The structured routings into an arrival fix are typically designed with doglegs. The design of the dogleg is two straight segments joined by an angle of less than 180 degrees. The purpose of the dogleg is to allow controllers to cut the corner as necessary to maintain the correct spacing between arrival aircraft.

2. Vectoring and Speed Control—If the actual spacing is more or less than the desired spacing, the controller can alter the speed of the aircraft to correct the spacing. Additionally, if the spacing is significantly smaller than desired, the controller can vector (turn) the aircraft off the route momentarily to increase the spacing. Given the last minute nature of these actions (within 100 mile of the airport), the outcome of such actions is limited.

3. The Approach Trombone—If too many aircraft arrive at a particular airport in a given period of time, the distance between the runway and base leg can be increased; see FIG. 5. This effectively lengthens the final approach and downwind legs allowing the controller to "store" or warehouse in-flight aircraft.

4. Miles in Trail—If the approach trombone can't handle the over demand for the runway asset, the ATC system begins spreading out the arrival/departure flow linearly. It does this by implementing "miles-in-trail" restrictions. Effectively, as the aircraft approach the airport for landing, instead of 5 to 10 miles between aircraft on the linear arrival/departure path, the controllers begin spacing the aircraft at 20 or more miles in trail, one behind the other; see FIG. 6.

5. Ground Holds—If the separation authorities anticipate that the approach trombone and the miles-in-trail methods will not hold the aircraft overload, aircraft are held at their departure point and metered into the system using assigned takeoff times.

6. Holding—If events happen too quickly, the controllers are forced to use airborne holding. Although this can be done anywhere in the system, this is usual done at one of the arrival fixes to an airport. Aircraft enter the "holding stack" from the enroute airspace at the top; see FIG. 7. Each holding pattern is approximately 10 to 20 miles long and 3 to 5 miles wide. As aircraft exit the bottom of the stack towards the airport, aircraft orbiting above are moved down 1,000 feet to the next level.

7. Reroute—If a section of airspace, enroute center, or airport is projected to become overloaded, the aviation authority occasionally reroutes individual aircraft over a longer lateral route to delay the aircraft's entry to the predicted congestion.

CAA's current air traffic handling procedures are seen to result in significant inefficiencies. For example, pilots routinely mitigate some of the assigned ground hold or reroute orders by increasing the aircraft's speed during its flight, which often yields significantly increased fuel expenses. Also, vectoring and speed control are usually accompanied with descents to a common altitude which may often be far below the aircraft's optimum cruise altitude, again with the use of considerable extra fuel. Further, the manual aspects of the sequencing and arrival ATC tasks can result in significantly greater separations between aircraft than are warranted; thereby significantly reducing an airport's landing capacity. Thus, despite the above noted prior art, airlines/CAAs/airports continue to need safer and more efficient methods and systems to better manage the arrival/departure flow of a plurality of aircraft into and out of a system resource, like an airport, or a set of system resources, so as to yield increased aviation safety and airline/airport/airspace operating efficiency.

SUMMARY OF THE INVENTION

The present invention is generally directed towards mitigating the limitations and problems identified with prior methods used by CAAs to manage their air traffic control function. Specifically, the present invention is designed to maximize the throughput of all aviation system resources, while limiting, or eliminating completely ground holds, reroutes, doglegs and vectoring by CAAs.

In accordance with one preferred embodiment of the present invention, a method for an aviation system to temporally manage the flow of a plurality of aircraft with respect to a specified system resource, based upon specified data, some of which are temporally varying, and operational goals pertaining to the aircraft and system resource, comprises the steps of (a) collecting and storing the specified data and operational goals, (b) processing, at an initial instant, the specified data which is applicable at that instant to the aircraft so as to predict an initial arrival fix time for each of the aircraft at the system resource, (c) specifying a goal function whose value is a measure of how well the system resource and plurality of aircraft meet their operational goals if the aircraft achieve given arrival fix times, and (d) utilizing the goal function to identify those arrival fix times to which the predicted, initial arrival fix times can be changed and result in the value of the goal function indicating a higher degree of attainment of the operational goals, wherein the identified arrival fix times are set as the targeted arrival fix times.

In accordance with another embodiment of the present invention, this method further comprises the step of: communicating information about the targeted arrival fix times to the aircraft so that the aircraft can change their trajectories so as to meet the targeted arrival fix times, monitoring the ongoing temporal changes in the specified data so as to identify temporally updated specified data, processing the temporally updated specified data to predict updated arrival fix times, computing an updated value of the specified goal function using the updated arrival fix times, comparing the updated and prior goal function values to determine whether the prior value continues to be met or exceeded, and, if the updated value continues to meet or exceed the prior value, continuing to use same targeted arrival fix times, or, if the updated value does not meet or exceed the prior value, repeat above utilization step so as to identify new, updated targeted arrival fix times which will yield a higher attainment of the operational goals.

In accordance with another preferred embodiment of the present invention, a system, including a processor, memory, display and input device, for an aviation system to temporally manage the flow of a plurality of aircraft with respect to a specified system resource, based upon specified data, some of which are temporally varying, and operational goals pertaining to the aircraft and system resource, is comprised of the means for achieving each of the process steps listed in the above methods.

Additionally, the present invention can take the form of a computer program product in a computer readable memory for controlling a processor to allow an aviation system to temporally manage the flow of a plurality of aircraft with respect to a specified system resource, based upon specified data, some of which are temporally varying, and operational goals pertaining to the aircraft and system resource, comprises: a means for collecting and storing the specified data and operational goals, a means for processing, at any given initial instant, the specified data which is applicable at that instant to the aircraft so as to predict an initial arrival fix time for each of the aircraft at the system resource, a means for specifying a goal function whose value is a measure of how well the system resource and plurality of aircraft meet their operational goals if the aircraft achieve given arrival fix times, a means for computing an initial value of the specified goal function using the predicted initial arrival fix times, and a means for utilizing the goal function to identify those arrival fix times to which the predicted, initial arrival fix times can be changed and result in the value of the goal function indicating a higher degree of attainment of the operational goals, wherein the identified arrival fix times are set as the targeted arrival fix times.

It is therefore an object of the present invention to provide a method and system which allows an aviation system (e.g., an airline, airport or CAA) to better achieve its specified safety and operational efficiency goals with respect to the arrival and departure of a plurality of aircraft at a specified system resource, like an airport, or set of resources, thereby overcoming the limitations of the prior art described above.

It is another object of the present invention to present a method and system for the real time management of aircraft that takes into consideration a wider array of real time parameters and factors that heretofore were not considered. For example, such parameters and factors may include: aircraft related factors (i.e., speed, fuel, altitude, route, turbulence, winds, weather) and ground services and common asset availability (i.e., runways, airspace, Air Traffic Control (ATC) services).

It is another object of the present invention to provide a method and system that will enable the airspace users to increase their safety and efficiency of operation.

It is yet another object of the present invention to provide a method and system that will allow an airport or other system resource to enhance its overall operating efficiency, even at the possible expense of its individual components that may become temporarily less effective. After the system's overall operation is optimized, then, as a secondary task, the present invention tries to enhance the efficiency of the individual components (i.e., meets a specific airline's business needs if provided) as long as they do not degrade the overall, optimized solution.

It is a further object of the present invention to provide a method and system that analyzes numerous real time information and other factors simultaneously, identifies system constraints and problems as early as possible, determines alternative possible trajectory sets, chooses the better of the evaluated asset trajectory sets, implements the new solution, and continuously monitors the outcome.

It is still a further object of the present invention to temporally manage the flow of aircraft into or out of a specific system resource in real time to prevent that resource from becoming overloaded. Further, if the outcome of prior events puts demand for that system resource above capacity, it is then the object of the present invention to maximize the throughput of the now constrained system resource with a consistent, more optimally sequenced flow of aircraft to/from that system resource.

Such objects are different from the current art, which manages aircraft into or out of a specific resource linearly using distance based processes, or limits access to the entire system, not just the specific constrained system resource.

These and other objects and advantages of the present invention will become readily apparent as the invention is better understood by reference to the accompanying drawings and the detailed description that follows.

BRIEF DESCRIPTION OF THE DRAWINGS

FIG. 1 presents a depiction of a typical aircraft flight process.

FIG. 2 illustrates a typical arrival/departure flow from a busy airport.

FIG. 3 illustrates an arrival bank of aircraft at Dallas/Ft. Worth airport collected as part of NASA's CTAS project.

FIG. 4 illustrates the December 2000, on-time arrival performance at sixteen specific airports for various one hour periods during the day.

FIG. 5 presents a depiction of the arrival/departure trombone method of sequencing aircraft.

FIG. 6 presents a depiction of the miles-in-trail method of sequencing aircraft.

FIG. 7 presents a depiction of the airborne holding method of sequencing aircraft.

FIG. 8 presents a depiction of the preferred method of the present invention for optimizing the control of aircraft approaching a specified airport.

FIG. 9 provides a spreadsheet illustration of the decision processes required to determine an airport's arrival/departure flow of aircraft.

FIG. 10 illustrates the various types of data that are used in the process of the present invention.

FIGS. 11A–11B illustrate the optimization processing sequence of the present invention.

FIG. 12 illustrates the difference between a random arrival flow of aircraft and a managed arrival flow of aircraft to an arrival fix.

FIG. 13 illustrates an aircraft scheduled arrival versus capacity at a typical hub airport. The graph is broken down into 15-minute blocks of time.

FIG. 14 illustrates a representative Goal Function of the present invention for a single aircraft.

FIG. 15 provides a Table that illustrates the value of a representative Goal Function of the present invention for two aircraft.

DEFINITIONS

ACARS—ARINC Communications Addressing and Reporting System. This is a discreet data link system between the aircraft and the airline. This provides very basic email capability between the aircraft and a limited sets of operational data and personnel. Functionality from this data link source includes operational data, weather data, pilot to dispatcher communication, pilot to aviation authority communication, airport data, OOOI data, etc.

Aircraft Situational Data (ASD)—This an acronym for a real time data source (approximately 1 to 5 minute updates) provided by the world's aviation authorities, including the Federal Aviation Administration, comprising aircraft position and intent for the aircraft flying over the United States and beyond.

Aircraft Trajectory—The movement or usage of an aircraft defined as a position, time (past, present or future). For example, the trajectory of an aircraft is depicted as a position, time and intent.

Airline—a business entity engaged in the transportation of passengers, bags and cargo on an aircraft.

Airline Arrival Bank—A component of a hub airline's operation where numerous aircraft, owned by the hub airline, arrive at a specific airport (hub airport) within in a very short time frame.

Airline Departure Bank—A component of a hub aviation's operation where numerous aircraft, owned by the hub aviation, depart at a specific airport (hub airport) within a very short time frame.

Airline Gate—An area or structure where aircraft owners/ airlines park their aircraft for the purpose of loading and unloading passengers and cargo.

Air Traffic Control System (ATC)—A system to assure the safe separation of moving aircraft by an aviation regulatory authority. In numerous countries, this system is managed by the Civil Aviation Authority (CAA). In the United States the federal agency responsible for this task is the Federal Aviation Administration (FAA).

Arrival fix/Cornerpost—At larger airports, the aviation regulatory authorities have instituted structured arrivals that bring all arrival/departure aircraft over geographic points (typically four). These are typically 30 to 50 miles from the arrival/departure airport and are separated by approximately 90 degrees. The purpose of these arrival fixes or cornerpost is so that the controllers can better sequence the aircraft, while keeping them separate from the other arrival/departure aircraft flows. In the future it may be possible to move these merge points closer to the airport, or eliminate them all together. As described herein, the arrival fix cornerpost referred to herein will be one of the points where the aircraft flows merge. Additionally, besides an airport, as referred to herein, arrival fixes can refer to entry points to any system resource, e.g., a runway, an airport gate, a section of airspace, a CAA control sector, a section of the airport ramp, etc. Further, an arrival fix/cornerpost can represent an arbitrary point in space where an aircraft flow merges at some past, present or future time.

Asset—To include assets such as aircraft, airports, runways, and airspace, etc.

Automatic Dependent Surveillance (ADS)—A data link surveillance system currently under development. The system, which is installed on the aircraft, captures the aircraft position from the navigation system and then communicates it to the CAA/FAA and other aircraft.

Aviation Authority—This is the agency responsible for the separation of aircraft when they are moving. Typically, this is a government-controlled agency, but a recent trend is to privatize this function. In the US, this agency is the Federal Aviation Administration (FAA). In numerous other countries, it is referred to as the Civil Aviation Authority (CAA). As referred to herein, it can also mean an airport authority which manages the airport.

Aviation System—As referred to herein, meant to represent an airline, airport, CAA, FAA or any other organization or system that has or can provide impact on the flow of a plurality of aircraft into or out of a system resource.

Block Time—The time from aircraft gate departure to aircraft gate arrival. This can be either scheduled block time (schedule departure time to scheduled arrival/departure time as posted in the aviation system schedule) or actual block time (time from when the aircraft door is closed and the brakes are released at the departure station until the brakes are set and the door is open at the arrival/departure station).

CAA—Civil Aviation Authority. As used herein is meant to refer to any aviation authority responsible for the safe separation of moving aircraft, Cooperative Decision-Making (CDM)—A recent program between FAA and the airlines wherein the airlines provide the FAA a more realistic schedule of their aircraft. For example if an airline cancels 20% of its flights into a hub because of bad weather, it would advise the FAA. In turn, the FAA compiles the data and redistributes it to all participating members.

Common Assets—Assets that must be utilized by the all airspace/airport/runway users and which are usually controlled by the aviation authority (i.e., CAA, FAA, airport). These assets (i.e., runways, ATC system, airspace, etc.) are not typically owned by any one airspace user.

CTAS—Center Tracon Automation System—This is a NASA developed set of tools (TMA, FAST, etc.) that seeks to temporally manage the arrival flow of aircraft from approximately 150 miles from the airport to landing.

Federal Aviation Administration—The government agency responsible for the safe separation of aviation aircraft while they are moving in the airspace above the United States.

Four-dimensional Path—The definition of the movement of an object in one or more of four dimensions—x, y, z and time.

Goal Function—a method or process of measurement of the degree of attainment for a set of specified goals. As further used herein, a method or process to evaluate the current scenario against a set of specified goals, generate various alternative scenarios, with these alternative scenarios, along with the current scenario then being assessed with the goal attainment assessment process to identify which of these alternative scenarios will yield the highest degree of attainment for a set of specified goals. The purpose of the Goal function is to find a solution that "better" meets the specified goals (as defined by the operator) than the present condition and determine if it is worth (as defined by the operator) changing to the "better" condition/solution. This is always true, whether it is the initial run or one generated by the monitoring system. In the case of the monitoring system (and this could even be set up for the initial condition/solution as well), it is triggered by some defined difference (as defined by the operator) between the how well the present condition meets the specified goals versus some "better" condition/solution found by the present invention. Once the Goal function finds a "better" condition/solution that it determines is worth changing to, the present invention translates said "better" condition/solution into some doable task and then communicates this to the interested parties, and then monitors the new current condition to determine if any "better" condition/solution can be found and is worth changing again.

Hub Airline—An airline operating strategy whereby passengers from various cities (spokes) are funneled to an interchange point (hub) and connect to various other cities. This allows the airlines to capture greater amounts of traffic flows to and from cities they serve, and offers smaller communities one-stop access to literally hundreds of nationwide and worldwide destinations.

IFR—Instrument Flight Rules. A set of flight rules wherein the pilot files a flight plan with the aviation authorities responsible for separation safety. Although this set of flight rules is based on instrument flying (e.g., the pilot references the aircraft instruments) when the pilot cannot see at night or in the clouds, the weather and the pilot's ability to see outside the aircraft are not a determining factors in IFR flying. When flying on a IFR flight plan, the aviation authority (e.g., ATC controller) is responsible for the separation of the aircraft when it moves.

OOOI—A specific aviation data set of; when the aircraft departs the gate (Out), takes off (Off), lands (On), and arrives at the gate (In). These times are typically automatically sent to the airline via the ACARS data link, but could be collected in any number of ways.

PASSUR—A passive surveillance system usually installed at the operations centers at the hub airport by the hub airline. This device allows the airline's operational people on the ground to display the airborne aircraft in the vicinity (up to approximately 150 miles) of the airport where it is installed.

Strategic Management—The use of policy level, long range information (current time up to "n1" hours into the future, where "n1" is defined by the regulatory authority, typically 6 to 24 hours) to determine demand and certain choke points in the airspace system.

System Resource—a resource like an airport, runway, gate, ramp area, or section of airspace, etc, that is used by all aircraft. A constrained system resource is one where demand for that resource exceeds capacity. This may be an airport with 70 aircraft that want to land in a single hour, with landing capacity of 50 aircraft per hour. Or it could be an airport with 2 aircraft wanting to land at the same exact time, with capacity of only 1 landing at a time. Or it could be a hole in a long line of thunderstorms that many aircraft want to utilize. Additionally, this can represent a group or set of system resources that can be managed simultaneously. For example, an arrival cornerpost, runaway and gate represent a set of system resources that can be managed as a combined set of resources to better optimize the flow of aircraft.

Tactical Management—The use of real time information (current time up to "n" minutes into the future, where "n" is defined by the aviation regulatory authority, typically 15 to 30 minutes) to modify future events.

Trajectory—See aircraft trajectory and four-dimensional path above.

VFR—Visual Flight Rules. A set of flight rules wherein the pilot may or may not file a flight plan with the aviation authorities responsible for separation safety. This set of flight rules is based on visual flying (e.g., the pilot references visual cues outside the aircraft) and the pilot must be able to see and cannot fly in the clouds. When flying on a VFR flight plan, the pilot is responsible for the separation of the aircraft when it moves.

DESCRIPTION OF THE PREFERRED EMBODIMENT

Referring now to the drawings wherein are shown preferred embodiments and wherein like reference numerals designate like elements throughout, there is shown in the drawings to follow the decision steps involved in a method of the present invention. This method effectively manages the temporal flow of a plurality of aircraft arrivals into an aviation system resource or set of resources.

For ease of understanding, the ensuing description is based on managing the temporal flow of a plurality of aircraft arrivals into a single system resource (e.g., an airport) based on arrival fix times or enroute speed as necessary to meet the target arrival fix times that have been assigned to the various aircraft. These fix times are set based upon consideration of specified data, regarding the capacity of the airport and arrival paths, aircraft positions, aircraft performance, user requirements (if available) and the weather, etc. that has been processed so as to identify that set of arrival fix times which allows the airline flying the aircraft into an airport and/or a CAA controlling the airport to better achieve its specified safety and operational efficiency goals.

As discussed above, the overall goal of the present invention is to increase aviation safety and efficiency through the real time management of aircraft from a system perspective. It is important to note that the present invention is in some ways the combination of several process steps. These various processes involved in these steps include:

1. An asset trajectory tracking (i.e., three spatial directions and time) process that looks at the current position and status of all aircraft and other system resource assets,
2. An asset trajectory predicting process that inputs the asset's current position and status into an algorithm which predicts the asset's future position and status for a given specifiable time or a given specifiable position,
3. A goal attainment assessment process that assesses at any given instant, based on the inputted position and status of these assets, the degree of attainment of the system resource's and aircraft's specified safety and operational efficiency goals,
4. An alternative trajectory scenario generation process that generates various alternative trajectories for the set of aircraft arriving and departing at the control airport (or other system resource); with these alternative scenarios then being assessed with the goal attainment assessment process to identify which of these alternative scenarios will yield the highest degree of attainment (i.e., better optimized) of the aviation authority's and aircraft's goals,
5. A process for translating these alternative trajectories into a new set of targeted arrival fix times or enroute speed as necessary to meet the target arrival fix times for the aircraft,
6. An optional validation and approval process which entails an airline/CAA or other system operator validating the practicality and feasibility of assigning the new set of optimized arrival fix times or enroute speed as necessary to meet the target arrival fix times to the set of arriving aircraft, then approving the assignment of these new, arrival fix times to the effected aircraft,
7. A communication process which involves an airline/CAA, other system operator or automated process communicating these new arrival, fix times to the effected aircraft,
8. A closed loop monitoring process, which involves continually monitoring the current state of these assets. This monitoring process measures the current state of the assets against system capacity and their ability to meet the new assigned arrival fix times. If at anytime the actions or change in status of one of the aircraft or other system resource assets would preclude the meeting of the arrival fix times, or the measurement of the attainment of the current system solution drops below a specified value, the airline/CAA or other system operator can be notified, or the system can automatically be triggered, at which time the search for better, alternative scenarios can be renewed.

FIG. 8 provides a flow diagram that represents the decision steps involved in the control of the aircraft approaching an airport whose operations are sought to be optimized. It denotes (step 801) how it must first be determined if the aircraft are sequenced safely and efficiently. In step 802, this method is seen to evaluate all of the trajectories of the aircraft to determine if temporal changes to these trajectories would yield a solution where a safer, more efficient sequence of arrival times can be found. If this cannot be done, this method involves then jumping to step 805.

If temporal modifications to the trajectories of the aircraft can produce a better match to a safer, more efficient arrival/departure sequence, the cost of these changes must be compared to the benefit produced (step 803). If the cost does not justify the changes to the trajectory, the process must default to step 805 once again.

Conversely, if the cost of modifications to one or more of the trajectories of the aircraft is lower then the benefit produced, the method then entails, with the approval of the airline/CAA or other system operator, if required, communicating the new trajectory goals to the individual aircraft (step 804).

Finally, the method involves monitoring the assets to determine if each of the aircraft will meet their current/new trajectory goal (step 806). This method continuously analyzes aircraft from present time up to "n" hours into the future, where "n" is defined by the airline/CAA. The overall time frame for each analysis is typically twenty-four hours, with this method analyzing the hub arrival/departure bank at least three to five hours into the future and then continuously monitoring the aircraft as they proceed to approach the airport.

This method is seen to avoid the pitfall of sub-optimizing particular parameters. This method accomplishes this by assigning weighted values to various factors that comprise the airline/CAA's/airport's safety and operational goals. While the present invention is capable of providing a linear (i.e., aircraft by aircraft optimization) solution to the optimized control of a plurality of aircraft approaching an airport, it is recognized that a multi-dimensional (i.e., optimize for the whole set of aircraft, airport assets, system resources, etc.) solution provides a better, safer and more efficient solution for the total operation of the airport, including all aspects of the arrival/departure flow. For the sake of brevity, only the aircraft movement aspects into an airport are described herein in detail. It should be understood that the present invention works as well with the flow of aircraft into or out of any aviation system resource (e.g., airspace, runways, gates, ramps, etc.).

Since the implementation of the method of the present invention uses a multi-dimensional solution that evaluates numerous parameters simultaneously, the standard, yes-no flow chart is difficult to construct for the present invention. Therefore, a spreadsheet, decision table has been included as FIG. 9 to better depict the implementation of the present invention.

Decisions 1 and 2 in this spreadsheet are seen to involve a number of airline/user/pilot defined parameters that contribute to determining an aircraft's optimal arrival/departure time. Since it would be difficult for a CAA/airport to collect the necessary data to make these decisions, one embodiment of the present invention leaves these decisions to the airline/user/pilot. That said, it would then be incumbent on the airline/user/pilot to coordinate their requirements to the CAA/airport so that they can be used to develop an overall optimization of the flow of a plurality of aircraft traffic into an airport.

In Decision 1, and initially ignoring other possibly interfering factors such as the weather, other aircraft's trajectories, external constraints to an aircraft's trajectory, etc., upwards of twenty aircraft parameters must be balanced simultaneously to optimize the overall performance of each aircraft. This is quite different than current business practices within the aviation industry, which includes focusing decision making on a very limited data set (i.e., scheduled on-time arrival, and possibly one other parameter—fuel burn, if any at all).

In Decision 2, an airline's local facilities at the destination airport are evaluated for their ability to meet the needs and/or wants of the individual aircraft, while also considering their possible interactions with the other aircraft that are approaching the same airport. These requirements of the airline/user/pilot must then be communicated to the CAA/ airport.

The use of this communicated information and other data (e.g., airport's resource data, weather, and other data compiled by the aviation authority) in the Decision 3 phase of this process is the primary area of focus of the current invention. Here, the user of the present invention focuses on airspace/runway/arrival/departure capacity and assigns coordinated, arrival fix times so as to meet the airport's specified safety and operational efficiency goals.

For hub airports, this can be a daunting task as thirty to sixty of a single airline's aircraft (along with numerous aircraft from other airlines) are scheduled to arrive at the hub airport in a very short period of time. The aircraft then exchange passengers, are serviced and then take off again. The departing aircraft are also scheduled to takeoff in a very short period of time. Typical hub operations are one to one and a half hours in duration and are repeated eight to twelve times per day.

FIG. 10 illustrates the various types of data sets that are used in this decision making process, these include: air traffic control objectives, generalized surveillance, aircraft kinematics, communication and messages, airspace structure, airspace and runway availability, user requirements (if available), labor resources, aircraft characteristics, arrival/departure and departure times, weather, gate availability, maintenance, other assets, and safety, operational and efficiency goals.

FIGS. 11A–11B illustrate the optimization processing sequence of the present invention. In step 1101A, a set of aircraft is selected whose safe and efficient operation into a specified airport, during a specified "time window," is sought to be optimized. The "time window" usually refers to the "arrival bank" of aircraft into the specified airport. The aircraft from outside this window are not submitted for optimization in this scheduling process, but they are taken into account as far as they may impose some limitations on those who are in the selected set of aircraft.

In step 1102A, the positions and future movement plans for all of the aircraft, including their predicted arrival fix times, are identified with input from databases which include Automatic Dependent Surveillance (ADS), FAA's Aircraft Situational Data (ASD), those of the airlines (if available) and any other information (e.g., weather) available as to the position and intent of the aircraft. This calculation of the future movements for the selected set of aircraft can be computed using an assortment of relatively standard software programs (e.g., "Aeralib," from Aerospace Engineering & Associates, Landover, Md. and/or Attila, Patent Pending Ser. No. 09/549074, from ATH Group) with inputted information for each aircraft that includes information such as filed flight plan, current position, altitude and speed, data supplied from the airline/ user/pilot, etc.

In step 1103A, these predicted arrival fix times for the aircraft in the set are used to compute the value of a "goal" function which is a measure of how well this set of aircraft will meet their safety and operational goals if they achieve the predicted arrival fix times. This goal function can be defined in many ways. However, a preferred method is to define it as the sum of the weighted components of the various factors or parameters that are used to measure an aircraft's and/or runway's operational performance (e.g., factors such as: utilizing all of the runway capacity, difference between scheduled and actual arrival time, fuel efficiency for the flight, landing at a time when the aircraft can be expeditiously unloaded and serviced).

In step 1104A, this goal function is optimized with respect to these predicted arrival times by identifying potential changes in these predicted arrival times so as to increase the value of the overall solution as determined by the goal function. The solution space in which this search is conducted has requirements place upon it which ensure that all of its potential solutions are operational. These requirements include those such as: no two aircraft occupy the same arrival time slot, others take into account the individual aircraft's performance capabilities (e.g., maximum speed/ altitude, and fuel available).

In step 1105A, once a solution set of arrival times is generated, these changes are translated into a new set of targeted arrival times or enroute speeds, as necessary, to meet the target arrival fix times for the aircraft.

In step 1106A, this new set of targeted arrival times or enroute speeds to meet the target arrival fix times is communicated to the pilots of the individual aircraft, which make up the set of interest. While as stated in the definitions, the arrival fix is a point some distance from the airport, in the future it can be moved closer to the airport, and can even be the landing point. This communication can be direct to the pilot through the ATC controller using voice or data link, or indirectly, through the airline/operator to the pilot. Additionally, this new set of targeted arrival times can be negotiated between the airline/operator and the CAA, where alterations can be made and sent back to the aviation authority for approval and re-optimization.

Even after these new targeted arrival times are established, the status of the various aircraft continues to be monitored, predictions continue to be made for their arrival fix times, and these continue to be compared to the solution set of targeted arrival fix times so as to quickly identify any newly developing conflicts. If such new conflicts do develop, the process begins again and appropriate adjustments are made to the conflicted aircraft's targeted arrival fix times.

Thus, the present invention allows for the altering of the aircraft's landing times forward and backward in time so as to deliver the aircraft to a system resource (i.e., runway) in an orderly fashion. As in the just-in-time manufacturing processes, these aircraft must be delivered not too early, not too late, but right on time to maximize the throughput of the system resource.

The present invention's ways of optimizing an airport's operation differs from the current industry practices in several, important ways. First, the current gate hold process is often negated by the individual actions of the pilot through their various speed control measures once airborne. Additionally, since the typical "gate hold process" does not use all of the available, relevant data or is often implemented too far in advance, the value of such actions is lowered considerably and often leads to less than optimal aircraft flow. Second, since the arrival sequence is left to the controller near the airport or is set by the linear flow requirement of the current ATC system farther from the airport, it is either too late or too difficult to change the sequence by moving the sequence forward in time to allow for a more optimal flow of aircraft.

To further illustrate the present invention, consider the situation in which an airline/CAA is attempting to maximize the use of a runway—land the most aircraft in the least amount of time. Two parameters that effect runway usage are the consistency of the flow and sequencing of the arrival aircraft.

As discussed above, in the current art, the flow of aircraft is random and based on numerous independent decisions which leads to wasted runway capacity. See FIG. 12. The present invention contributes to reducing wasted runway capacity by identifying and correcting potential arrival bunching or wasted capacity early, typically one to three hours (or more) before arrival. It does this as a result of having predicted the aircraft's trajectories, so that this flow can be spread both forward and backward so as to resolve the bunching. The decision as to which aircraft are moved forward or backward is based on numerous parameters, including the aircraft's speed capabilities, the weather along the various flight trajectories, flight connection requirements, etc.

As also discussed above, the order of the aircraft, or their sequencing, as they approach the airport can also effect a runway's landing capacity. The present invention allows for the optimum sequencing of these aircraft so as to maximize a runway's landing capacity.

In conjunction with the goal of efficiently managing the flow and sequencing of the aircraft to increase runway capacity, there are numerous other areas of the arrival process that can be optimized by the real time management of the arrival/departure flow of aircraft to an airport. These include: reduction of low altitude maneuvering, decreased length of the final approach leg, reduced fuel burn, on schedule arrival, decreased controller workload, maximum utilization of the runway asset, minimizing ramp/taxiway congestion, etc.

The first step is to determine the parameters/goals that the method is trying to optimize. While it is recognized that the present invention can manage and optimize many parameters simultaneously, for the purpose of describing how the system works, it proves instructive to consider a goal or goal function which is comprised of only a limited number of parameters. Consider the goal function comprised of the following parameters or elementary goals: (1) land an aircraft every minute, (2) have the incoming aircraft use a minimum amount of fuel, and (3) have the aircraft land on schedule.

To achieve the optimization of such a goal function, the present invention continuously determines the current position of all of the aircraft that are scheduled to arrive at a particular airport, or are enroute to that airport, say Atlanta (ATL). It does this by accessing ASD (providing aircraft current position and future flight intent), airline flight plans, or other position data, from numerous available sources. Using this current aircraft position data and stated future intent, the present invention builds a trajectory so that it establishes an estimated time that each of the aircraft will arrive at the runway (or arrival fix). These initial trajectories are built by the present invention without regard to what the controller will do, but built as if the aircraft is the only aircraft in the sky. In other words, these initial trajectories disregard the actions that the controller must take, absence the present invention, to linearize the arrival flow of aircraft as they near the runway.

After the trajectories are built, the present invention must determine the accuracy of the trajectories. It is obvious that if the trajectories are very inaccurate, the quality of any solution based on these trajectories will be less than might be desired. The present invention determines the accuracy of the trajectories based on an internal predetermined set of rules and then assigns a Figure of Merit (FOM) to each trajectory. For example, if an aircraft is only minutes from landing, the accuracy of the estimated landing time is very high. There is simply too little time for any action that could alter the landing time significantly. Conversely, if the aircraft has filed its flight plan (intent), but has yet to depart Los Angeles for ATL there are many actions or events that would decrease the accuracy of the predicted arrival time.

It is easily understood that the FOM for these predictions is a function of time. The earlier in time the prediction is made, the less accurate the prediction will be and thus the lower its FOM. The closer in time the aircraft is to landing, the higher the accuracy of the prediction, and therefore the higher its FOM. Effectively, the FOM represents the confidence the present invention has in the accuracy of the predicted landing times. Along with time, other factors in determining the FOM includes validity of intent, available of wind/weather data, availability of information from the pilot, etc.

Once the trajectories are built and their FOMs are determined high enough, the value of goal function is computed based on these predicted arrival times. Such a computation of the goal function often involves an algorithm that assigns a numerical value to each of its parameters based on the predicted arrival times. Often these parameters can be effected in contrasting ways by changing the predicted arrival times one way or another. For example, while it is an assumed goal to land an aircraft every minute, if the aircraft are not spaced properly, one solution is to speed up some of the aircraft, which requires more fuel to be used. Landing every minute is a plus, while burning extra fuel is a minus.

An example of how these goal function parameters might be defined is provided by considering the goal of landing one aircraft of every minute. If the time between the arriving aircraft is more or less than 1 minute, this parameter is assigned a number whereby numbers close to zero reflect closer attainment of the goal. For example, if an aircraft is one minute behind another aircraft, it is assigned a value of zero. If the distance is 2 minutes, it is assigned a value of 10. If the distance is 3 minutes, its value is 100, and so on.

In the scenario in which we have an aircraft predicted to land at 12:15 (#1), no aircraft predicted to land at 12:16, 12:17, 12:18, or 12:19, and four aircraft (#2 through #5) predicted to land at 12:20, we see that one has an opportunity to optimize that part of the goal function which is dependent on this parameter. A first potential solution for accomplishing this might be to move #2 to 12:16, #3 to 12:17, #4 to 12:18 and #5 at 12:19. Yet to do this requires more fuel to be used by aircraft #2 through #5. Further complicating this problem could be the fact that aircraft #4 is already 5 minutes late, while #2 is 4 minutes early, #3 is on time, while #5 is two minutes late.

If the goal function is defined simply as the sum of the parameters for the various aircraft whose operation and safety are sought to be optimized, we have what can be thought as a linear process in which the goal function can be optimized by simply optimizing each aircraft's parameters. Alternatively, if we define our goal function to be a more complicated, or nonlinear, function so that we take into consideration how changes in one aircraft's predicted arrival time might necessitate a change in another aircraft's predicted arrival time, it is not so clear as to how to optimize the goal function. However, as is well known in the art, there exist many mathematical techniques for optimizing even very complicated goal functions. Meanwhile, it is recognized that such a nonlinear (i.e., optimize for the whole set of aircraft, airport assets, etc.) solution will often provide a better, safer and more efficient solution for the total operation of the airport, including all aspects of the arrival/departure flow.

To provide a better understanding how this goal function process' optimization routine may be performed, consider the following mathematical expression of a typical scheduling problem in which a number of aircraft, 1 . . . n, are expected to arrive to a given point at time values $t_1$ . . . $t_n$. They need to be rescheduled so that:

The time difference between two arrivals is not less than some minimum, $\Delta$;
  The arrival/departure times are modified as little as possible;
  Some aircraft may be declared less "modifiable" than others.
  We use $d_i$ to denote the change (negative or positive) our rescheduling brings to $t_1$. We may define a goal function that measures how "good" (or rather "bad") our changes are for the whole aircraft pool as $$G_1 = \Sigma_i |d_i/r_i|^K$$

where $r_i$ are application-defined coefficients, putting the "price" at changing each $t_i$ (if we want to consider rescheduling the i-th aircraft "expensive", we assign it a small $r_i$, based, say, on safety, airport capacity, arrival/departure demand and other factors), thus effectively limiting its range of adjustment. The sum runs here through all values of i, and the exponent, K, can be tweaked to an agreeable value, somewhere between 1 and 3 (with 2 being a good choice to start experimenting with). The goal of the present invention is to minimize $G_1$ as is clear herein below.

Next, we define the "price" for aircraft being spaced too close to each other. For the reasons, which are obvious further on, we would like to avoid a non-continuous step function, changing its value at $\Delta$. A fair continuous approximation may be, for example, $$G_2 = \Sigma_{ij} P((\Delta - |d_{ij}|)/h)$$

where the sum runs over all combinations of i and j, h is some scale factor (defining the slope of the barrier around $\Delta$), and P is the integral function of the Normal (Gaussian) distribution. $d_{ij}$ stands here for the difference in time of arrival/departure between both aircraft, i.e., $(t_i+d_i)-(t_j+d_j)$.

Thus, each term is 0 for $|d_{ij}| >> \Delta+h$ and 1 for $|d_{ij}| << \Delta-h$, with a continuous transition in-between (the steepness of this transition is defined by the value of h). As a matter of fact, the choice of P as the Normal distribution function is not a necessity; any function reaching (or approaching) 0 for arguments<<−1 and approaching 1 for arguments>>+1 would do; our choice here stems just from the familiarity.

A goal function, defining how "bad" our rescheduling (i.e., the choice of d) is, may be expressed as the sum of $G_1$ and $G_2$, being a function of $d_1$ . . . $d_n$:

$$G(d_1 \ldots d_n) = K \cdot \Sigma C_i d_i^2 + \Sigma_{ij} P((\Delta - |d_{ij}|)/h)$$

with K being a coefficient defining the relative importance of both components. One may now use some general numerical technique to optimize this function, i.e., to find the set of values for which G reaches a minimum. The above goal function analysis is applicable to meet many, if not all, of the individual goals desired by an airline/aviation authority.

To illustrate this optimization process, it is instructive to consider the following goal function for n aircraft:

$$G(t_1 \ldots t_n) = G_1(t_1) + \ldots + Gn(t_n) + G_0(t_1 \ldots t_n)$$

where each $G_i(t_i)$ shows the penalty imposed for the i-th aircraft arriving at time $t_i$, and $G_0$—the additional penalty for the combination of arrival times $t_1$ . . . $t_n$. The latter may, for example, penalize when two aircraft take the same arrival slot.

In this simplified example we may define $$G_i(t) = a^{\times}(t-t_S)^2 + b^{\times}(t-t_E)^2$$

so as to penalize an aircraft for deviating from its scheduled time, $t_s$ on one hand, and from its estimated (assuming currents speed) arrival time, $t_E$, on the other.

Let us assume that for the #1 aircraft $t_s$=10, $t_e$=15, a=2 and b=1. Then its goal function component computed according to the equation above, and as shown below, will be a square parabola with a minimum at t close to 12 (time can be expressed in any units, let us assume minutes). Thus, this is the "best" arrival time for that aircraft as described by its goal function and disregarding any other aircraft in the system.

With the same a and b, but with $t_S$=11 and $t_E$=14, the #2 aircraft's goal function component looks quite similar: the comparison is shown in the above graph.

Now let us assume that the combination component, is set to 1000 if the absolute value $(t_i-t_2)<1$ (both aircraft occupy the same slot), and to zero otherwise. Table 1 shows the goal function values for these two aircraft:

TABLE 1

Total Goal Function for a system of two aircraft (example)

| | $t_2$ = 10 | $t_2$ = 11 | $t_2$ = 12 | $t_2$ = 13 | $t_2$ = 14 | $t_2$ = 15 |
|---|---|---|---|---|---|---|
| $t_1$ = 10 | 1043 | 34 | 31 | 34 | 43 | 58 |
| $t_1$ = 11 | 36 | 1027 | 24 | 28 | 36 | 51 |
| $t_1$ = 12 | 35 | 26 | 1023 | 26 | 35 | 50 |
| $t_1$ = 13 | 40 | 31 | 28 | 1031 | 40 | 55 |
| $t_1$ = 14 | 51 | 42 | 39 | 42 | 1051 | 66 |
| $t_1$ = 15 | 68 | 59 | 56 | 59 | 68 | 1083 |

The minimum (best value) of the goal function is found at $t_i$=11 and $t_2$=12, which is consistent with the common sense: both aircraft are competing for the $t_2$=12 minute slot, but for the #1 aircraft, the $t_1$=11 minute slot is almost as good. One's common sense would, however, be expected to fail if the number of involved aircraft exceeds three or five, while this optimization routine for such a defined goal function will always find the best goal function value.

Finally, to better illustrate the differences between the present invention and the prior means used for managing an airport's air traffic, consider the following examples:

EXAMPLE 1

When weather at an airport is expected to deteriorate to the point such that the rate of landings is lowered, the aviation authorities will "ground hold" aircraft at their departure points. Because of rapidly changing conditions and the difficulty of communicating to numerous aircraft that are being held on the ground, it happens that expected 1 to 2 hour delays change to 30 minute delays, and then to being cancelled altogether within a fifteen minute period. Also, because of various uncertainties, it may happen that by the time the aircraft arrives at its destination, the imposed constraint to the airport's landing rate is long since past and the aircraft is sped up for landing. An example of this scenario occurs when a rapidly moving thunderstorm which clears the airport hours before the aircraft is scheduled to land.

In an embodiment of the present invention, if an airport arrival rate is expected to deteriorate to the point such that the rate of landings is lowered, the present invention calculates arrival fix times for arriving aircraft based on a large set of parameters, including the predicted landing rate. The arrival fix times are communicated to the aircraft and the pilot departs and manages the flight path as necessary to meet the assigned arrival fix time. This allows the aircraft to fly a significantly more fuel-efficient speed and route. Additionally, this consistent flow of materials (aircraft) to the capacity limited airport/airspace is not only safer, but a consistent flow of materials is easier for the controllers to handle and therefore actual capacity is enhanced over the current, linear flow system.

Further, if the landing rate rises sooner than expected, the aircraft are already airborne, and therefore can react faster to new arrival fix times or enroute speed as necessary to meet the target arrival fix times to take full advantage of the available capacity.

EXAMPLE 2

Numerous aviation delays are caused by the unavailability of an arrival gate or parking spot. Current airline/airport management techniques typically assign gates either too early (i.e., months in advance) and only make modifications after a problem develops, or too late (i.e., when the aircraft lands). In an embodiment of the present invention, gate availability, as provided by the airline/airport, is integrated into the arrival flow solution. By assigning the arrival fix times based on real time gate availability, more aircraft can be accommodated at the airport. This allows those aircraft with gates to land, and slows those aircraft without gates to a more fuel-efficient speed.

EXAMPLE 3

Given the increased predictability of the aircraft arrival/departure time, the process of the present invention helps the airlines/users/pilots to more efficiently sequence the ground support assets such as gates, fueling, maintenance, flight crews, etc.

EXAMPLE 4

Hub operations typically require a large number of actions to be accomplished by an airline in a very short period of time. One such group of events is hub landings and takeoffs. Typically in a tightly grouped hub operation, the departures of an airline's aircraft from the last hub operation compete for runway assets (a common asset) with the arrivals of the same airline for the next hub operation. It is one embodiment of the present invention to coordinate landing times with takeoff times for the aircraft, thus allowing the aviation authorities to minimize delays for access to the available runway for both takeoffs and landings or, with coordination with the airline/operator, allow delays to accrue to the aircraft that can best tolerate delays.

EXAMPLE 5

Embodied in the current art is the practice of rerouting aircraft around what is perceived as congested airspace. For example, the aviation authorities see a flight from Los Angeles to Philadelphia that is flight planned through what is predicted to be a congested group of ATC sectors just east of Johnstown, Pa. To alleviate this problem, prior to takeoff, the aviation authorities reroute the aircraft such that, instead of flying just south of Chicago, Ill., the aircraft is on a more northerly route over Green Bay, Wis., adding over 100 miles to the lateral path of the aircraft.

If this reroute is done as the aircraft approaches the runway for takeoff, often the case, not only does it add 12 to 13 minutes (the time necessary to fly the additional 100 miles) to the flight time, it delays the takeoff while the pilot analyzes the new route for fuel, weather, etc, as required by the aviation authorities. Once airborne, to mitigate this reroute, the pilot, assuming enough fuel, speeds up the aircraft to the point that the aircraft crosses over Johnstown on the longer route at the same time it would have on the shorter route based on the scheduled arrival time into Philadelphia.

The present invention can eliminate this type of rerouting. From prior to takeoff and throughout the flight, the present invention will continually analyze all of the airspace for potential congested areas. After sending an initial PHL arrival fix time, if the present invention continues to show the potential congestion over Johnstown at approximately one to three hours away from Johnstown, the aviation authorities now move to restrict the flow of aircraft through this airspace. The present invention does this by assigning crossing times at Johnstown for these aircraft that comprise the set of aircraft that are approaching Johnstown simultaneously which the aviation authorities have determined exceed capacity. Again, the focus of the present invention is to manage access to the problem, not limit access to the airspace system (i.e., ground holds at the departure airport) as is done in the current art. If the real time, time based sequencing of the present invention does not fully alleviate the congestion, the aviation authorities still have the option of rerouting some aircraft around the congested area as above.

EXAMPLE 6

The current thinking is that the airline delay/congestion problem arises from airline schedules that are routinely over airport capacity. The use of the present invention works to prevent real time capacity overloads by moving aircraft both forward and backward in time from a system perspective.

Take the example of the arrival flow at a typical hub airport as shown in FIG. 13. During the day, the airport has eight arrival banks that are scheduled above the airport capacity. For example at 8:00 demand is below capacity, but by 8:30, the scheduled arrival demand exceeds capacity by 9 aircraft in good weather and 17 aircraft in poor weather. And then by 9:00, demand is below capacity again.

It is one embodiment of the present invention to mitigate this actual over capacity in real time by moving aircraft forward in time into an area of less demand. By evaluating the set of aircraft leading up to and in the over capacity state, the present invention can assign earlier arrival fix times to those aircraft that have the ability to speed up. The present invention not only does this by moving over capacity aircraft forward in time, depending on the costs versus benefits. It may also move aircraft just prior to the over capacity period forward in time to accommodate more aircraft earlier.

Further, through coordination with the airline/operator, the airline/CAA can delay those aircraft that can best accommodate the delay (e.g., aircraft that are early or whose gate is not available until ten minutes after the potential landing time).

The solution to this example by the present invention can be viewed as clipping the top of a mountain. In the current art, the CAA solution is to move the top of the mountain above a certain altitude into the valley to the right of the mountain. Using the present invention, the offending mountain top (above the selected altitude) can be moved into the valleys left and right of the mountain top. While it is recognized that the movement of aircraft represent the core aviation process as described herein, the real time management of all of the aircraft is important to determining the most safe and efficient solution, for each given scenario.

The description of the management of the aircraft asset herein is also not meant to limit the scope of the patent. For example, the present invention will just as easily manage passengers as work-in-process assets, or gates, or food trucks, or pilots, etc., all of these, and other assets must be tactically managed to operate the aviation system in the most safe and efficient manner. Additionally, although the description of the current invention describes the time management of aircraft to an arrival fix, it just as easily manages departures or the flow of aircraft into or out of any system resource. These system resources may include a small path through a long line of otherwise impenetrable thunderstorms, an ATC control sector that is overloaded, etc.

The foregoing description of the invention has been presented for purposes of illustration and description. Further, the description is not intended to limit the invention to the form disclosed herein. Consequently, variations and modifications commensurate with the above teachings, and combined with the skill or knowledge in the relevant art are within the scope of the present invention.

The preferred embodiments described herein are further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the current art.

We claim:

1. A method for an aviation system to temporally manage the flow of a plurality of aircraft with respect to a specified system resource, based upon specified data, and operational goals pertaining to said aircraft and system resource, said method comprising the steps of:

collecting and storing said specified data and operational goals, processing, at any given initial instant, said specified data applicable at that instant to said aircraft so as to predict an initial arrival fix time for each of said aircraft at said system resource, specifying a goal function whose value is a measure of how well said system resource and plurality of aircraft meet their operational goals if said aircraft achieve given arrival fix times, computing an initial value of said specified goal function using said predicted initial arrival fix times, and utilizing said goal function to identify those arrival fix times to which said predicted, initial arrival fix times can be changed and result in the value of said goal function indicating a higher degree of attainment of said operational goals, wherein said identified arrival fix times are set as the targeted arrival fix times.

2. A method as recited in claim 1 wherein said optimization comprising the steps of:

establishing a goal value for said goal function which, when met or exceeded, implies that a desired degree of attainment of said operational goals have been met or exceeded, comparing said initial and goal values to determine whether said specified goal value has been met or exceeded, and if said initial value meets or exceeds said goal value, identifying initial arrival fix times as said targeted arrival fix times, if said initial value does not meet or exceed said goal value, utilizing said goal function to identify those arrival fix times to which said predicted, initial arrival fix times can be changed and result in the value of said goal function meeting or exceeding said goal value.

3. A method as recited in claim 2, further comprising the steps of:

monitoring the ongoing temporal changes in said specified data so as to identify temporally updated specified data, processing said temporally updated specified data to predict updated arrival fix times, computing an updated value of said specified goal function using said updated arrival fix times, comparing said updated and goal values to determine whether said specified goal value continues to be met or exceeded, if said updated value continues to meet or exceed said goal value, continuing to use same targeted arrival fix times, if said updated value does not meet or exceed said optimized value, repeat above step utilizing said goal function so as to identify new, updated targeted arrival fix times.

4. A method as recited in claim 3, wherein:

said specified data is chosen from the group consisting of the temporally varying positions and trajectories of said aircraft, the temporally varying weather conditions surrounding said aircraft and system resource, the flight handling characteristics of said aircraft, the safety regulations pertaining to said aircraft and system resource, the position and capacity of said system resource, said specified system resource is chosen from the group consisting of an airport, an arrival fix, a runway, a gate, a ramp area, ground equipment or a section of airspace.

5. A method as recited in claim 2, wherein:

said specified data is chosen from the group consisting of the temporally varying positions and trajectories of said aircraft, the temporally varying weather conditions surrounding said aircraft and system resource, the flight handling characteristics of said aircraft, the safety regulations pertaining to said aircraft and system resource, the position and capacity of said system resource, said specified system resource is chosen from the group consisting of an airport, an arrival fix, a runway, a gate, a ramp area, ground equipment or a section of airspace.

6. A method as recited in claim 1, further comprising the step of:

communicating information about said targeted arrival fix times to said aircraft so that said aircraft can change their trajectories so as to meet said targeted arrival fix times.

7. A method as recited in claim 6, wherein:

said specified data is chosen from the group consisting of the temporally varying positions and trajectories of said aircraft, the temporally varying weather conditions surrounding said aircraft and system resource, the flight handling characteristics of said aircraft, the safety regulations pertaining to said aircraft and system resource, the position and capacity of said system resource, said specified system resource is chosen from the group consisting of an airport, an arrival fix, a runway, a gate, a ramp area, ground equipment or a section of airspace.

8. A method as recited in claim 1, further comprising the steps of:

monitoring the ongoing temporal changes in said specified data so as to identify temporally updated specified data, processing said temporally updated specified data to predict updated arrival fix times, computing an updated value of said specified goal function using said updated arrival fix times, comparing said updated and optimized goal function values to determine whether said optimized value continues to be met or exceeded, if said updated value continues to meet or exceed said optimized value, continuing to use same targeted arrival fix times, if said updated value does not meet or exceed said optimized value, repeat above step utilizing said goal function so as to identify new, updated targeted arrival fix times.

9. A method as recited in claim 8, wherein:

said specified data is chosen from the group consisting of the temporally varying positions and trajectories of said aircraft, the temporally varying weather conditions surrounding said aircraft and system resource, the flight handling characteristics of said aircraft, the safety regulations pertaining to said aircraft and system resource, the position and capacity of said system resource, said specified system resource is chosen from the group consisting of an airport, an arrival fix, a runway, a gate, a ramp area, ground equipment or a section of airspace.

10. A method as recited in claim 1, wherein:

said specified data is chosen from the group consisting of the temporally varying positions and trajectories of said aircraft, the temporally varying weather conditions surrounding said aircraft and system resource, the flight handling characteristics of said aircraft, the safety regulations pertaining to said aircraft and system resource, the position and capacity of said system resource, said specified system resource is chosen from the group consisting of an airport, an arrival fix, a runway, a gate, a ramp area, ground equipment or a section of airspace.

11. A system, including a processor, memory, display and input device, for an aviation system to temporally manage the flow of a plurality of aircraft with respect to a specified system resource, based upon specified data, and operational goals pertaining to said aircraft and system resource, said system comprising:

a means for collecting and storing said specified data and operational goals, a means for processing, at an initial instant, said specified data applicable at that instant to said aircraft so as to predict an initial arrival fix time for each of said aircraft at said system resource, a goal function whose value is a measure of how well said system resource and plurality of aircraft meet their operational goals if said aircraft achieve given arrival fix times, a means for computing an initial value of said specified goal function using said predicted initial arrival fix times, a means for utilizing said goal function to identify those arrival fix times to which said predicted, initial arrival fix times can be changed and result in the value of said goal function indicating a higher degree of attainment of said operational goals, wherein said identified arrival fix times are set as the targeted arrival fix times.

12. A system as recited in claim 11, further comprising:

a means for communicating information about said targeted arrival fix times to said aircraft so that said aircraft can change their trajectories so as to meet said targeted arrival fix times.

13. A system as recited in claim 12, further comprising:

a means for monitoring the ongoing temporal changes in said specified data so as to identify temporally updated specified data.

14. A system as recited in claim 13, wherein:

said specified data is chosen from the group consisting of the temporally varying positions and trajectories of said aircraft, the temporally varying weather conditions surrounding said aircraft and system resource, the flight handling characteristics of said aircraft, the safety regulations pertaining to said aircraft and system resource, the position and capacity of said system resource, said specified system resource is chosen from the group consisting of an airport, an arrival fix, a runway, a gate, a ramp area, ground equipment or a section of airspace.

15. A system as recited in claim 12, wherein:

said specified data is chosen from the group consisting of the temporally varying positions and trajectories of said aircraft, the temporally varying weather conditions surrounding said aircraft and system resource, the flight handling characteristics of said aircraft, the safety regulations pertaining to said aircraft and system resource, the position and capacity of said system resource, said specified system resource is chosen from the group consisting of an airport, an arrival fix, a runway, a gate, a ramp area, ground equipment or a section of airspace.

16. A system as recited in claim 11, further comprising:

a means for monitoring the ongoing temporal changes in said specified data so as to identify temporally updated specified data.

17. A system as recited in claim 16, wherein:

said specified data is chosen from the group consisting of the temporally varying positions and trajectories of said aircraft, the temporally varying weather conditions surrounding said aircraft and system resource, the flight handling characteristics of said aircraft, the safety regulations pertaining to said aircraft and system resource, the position and capacity of said system resource, said specified system resource is chosen from the group consisting of an airport, an arrival fix, a runway, a gate, a ramp area, ground equipment or a section of airspace.

18. A system as recited in claim 11, wherein:

said specified data is chosen from the group consisting of the temporally varying positions and trajectories of said aircraft, the temporally varying weather conditions surrounding said aircraft and system resource, the flight handling characteristics of said aircraft, the safety regulations pertaining to said aircraft and system resource, the position and capacity of said system resource, said specified system resource is chosen from the group consisting of an airport, an arrival fix, a runway, a gate, a ramp area, ground equipment or a section of airspace.

19. A computer program product in a computer readable memory for controlling a processor to allow an aviation system to temporally manage the flow of a plurality of aircraft with respect to a specified system resource, based upon specified data, and operational goals pertaining to said aircraft and system resource, said computer program comprising:

a means for collecting and storing said specified data and operational goals, a means for processing, at an initial instant, said specified data applicable at that instant to said aircraft so as to predict an initial arrival fix time for each of said aircraft at said system resource, a means for specifying a goal function whose value is a measure of how well said system resource and plurality of aircraft meet their operational goals if said aircraft achieve given arrival fix times, wherein said goal function having a specified goal value which, when met or exceeded, implies that a desired degree of attainment of said operational goals have been met or exceeded, a means for computing an initial value of said specified goal function using said predicted initial arrival fix times, a means for utilizing said goal function to identify those arrival fix times to which said predicted, initial arrival fix times can be changed and result in the value of said goal function indicating a higher degree of attainment of said operational goals, wherein said identified arrival fix times are set as the targeted arrival fix times.

20. A computer program as recited in claim 19, further comprising:

a means for communicating information about said targeted arrival fix times to said aircraft so that said aircraft can change their trajectories so as to meet said targeted arrival fix times.

21. A computer program as recited in claim 20, further comprising:

a means for monitoring the ongoing temporal changes in said specified data so as to identify temporally updated specified data.

22. A computer program as recited in claim 22, wherein:

said specified data is chosen from the group consisting of the temporally varying positions and trajectories of said aircraft, the temporally varying weather conditions surrounding said aircraft and system resource, the flight handling characteristics of said aircraft, the safety regulations pertaining to said aircraft and system resource, the position and capacity of said system resource, said specified system resource is chosen from the group consisting of an airport, an arrival fix, a runway, a gate, a ramp area, ground equipment or a section of airspace.

23. A computer program as recited in claim 20, wherein:

said specified data is chosen from the group consisting of the temporally varying positions and trajectories of said aircraft, the temporally varying weather conditions surrounding said aircraft and system resource, the flight handling characteristics of said aircraft, the safety regulations pertaining to said aircraft and system resource, the position and capacity of said system resource, said specified system resource is chosen from the group consisting of an airport, an arrival fix, a runway, a gate, a ramp area, ground equipment or a section of airspace.

24. A computer program as recited in claim 19, further comprising:

a means for monitoring the ongoing temporal changes in said specified data so as to identify temporally updated specified data.

25. A computer program as recited in claim 24, wherein:

said specified data is chosen from the group consisting of the temporally varying positions and trajectories of said aircraft, the temporally varying weather conditions surrounding said aircraft and system resource, the flight handling characteristics of said aircraft, the safety regulations pertaining to said aircraft and system resource, the position and capacity of said system resource, said specified system resource is chosen from the group consisting of an airport, an arrival fix, a runway, a gate, a ramp area, ground equipment or a section of airspace.

26. A computer program system as recited in claim 19, wherein:

said specified data is chosen from the group consisting of the temporally varying positions and trajectories of said aircraft, the temporally varying weather conditions surrounding said aircraft and system resource, the flight handling characteristics of said aircraft, the safety regulations pertaining to said aircraft and system resource, the position and capacity of said system resource, said specified system resource is chosen from the group consisting of an airport, an arrival fix, a runway, a gate, a ramp area, ground equipment or a section of airspace.

* * * * *